US006977908B2

(12) United States Patent
de Azevedo et al.

(10) Patent No.: US 6,977,908 B2
(45) Date of Patent: Dec. 20, 2005

(54) METHOD AND APPARATUS FOR DISCOVERING COMPUTER SYSTEMS IN A DISTRIBUTED MULTI-SYSTEM CLUSTER

(75) Inventors: Marcelo de Azevedo, Round Rock, TX (US); Sachin U. Naik, Parwati (IN); Roger Cox, Los Altos, CA (US); Peter H. Lipman, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 903 days.

(21) Appl. No.: 09/945,083

(22) Filed: Aug. 31, 2001

(65) Prior Publication Data

US 2002/0075870 A1 Jun. 20, 2002

Related U.S. Application Data

(60) Provisional application No. 60/229,490, filed on Aug. 31, 2000, provisional application No. 60/227,899, filed on Aug. 25, 2000, provisional application No. 60/285,936, filed on Apr. 23, 2001, provisional application No. 60/286,053, filed on Apr. 23, 2001.

(51) Int. Cl.$^7$ ............................................. H04L 12/28
(52) U.S. Cl. ..................................... 370/254; 370/432
(58) Field of Search ............................... 370/254, 255, 370/256, 257, 312, 432; 709/208, 212, 220, 709/227, 249

(56) References Cited

U.S. PATENT DOCUMENTS

| | | | | |
|---|---|---|---|---|
| 5,185,560 A | * | 2/1993 | Nilssen | 315/219 |
| 5,282,270 A | * | 1/1994 | Oppenheimer et al. | 709/223 |
| 5,546,540 A | * | 8/1996 | White | 709/223 |
| 5,574,849 A | | 11/1996 | Sonnier et al. | 395/182.1 |
| 5,745,699 A | * | 4/1998 | Lynn et al. | 709/245 |
| 5,751,932 A | * | 5/1998 | Horst et al. | 714/12 |
| 5,781,534 A | * | 7/1998 | Perlman et al. | 370/248 |
| 6,286,047 B1 | * | 9/2001 | Ramanathan et al. | 709/224 |
| 6,426,947 B1 | * | 7/2002 | Banker et al. | 370/254 |
| 6,826,172 B1 | * | 11/2004 | Augart | 370/351 |

* cited by examiner

Primary Examiner—Kwang Bin Yao
Assistant Examiner—Kamran Emdadi

(57) ABSTRACT

A method of interconnecting a new node into a cluster of other nodes. The new node broadcasts a configuration (DP) packet describing itself to the other nodes of the cluster. The other nodes then respond by setting up communications information enabling the new node to directly communicate with a monitor process in the responding nodes and sending that information (DI packet) to the new node. The new node then sets up information enabling the responding nodes to communicate with a monitor process on the new node and sends that information (DC packet) to the responding nodes. The responding nodes then acknowledge the information (DA packet) and the new node is then interconnected with the responding nodes. The DP and DI packets are sent via a permissive interrupt mechanism, received by each processor unit making up a node and forwarded to the monitor process of the node.

27 Claims, 11 Drawing Sheets

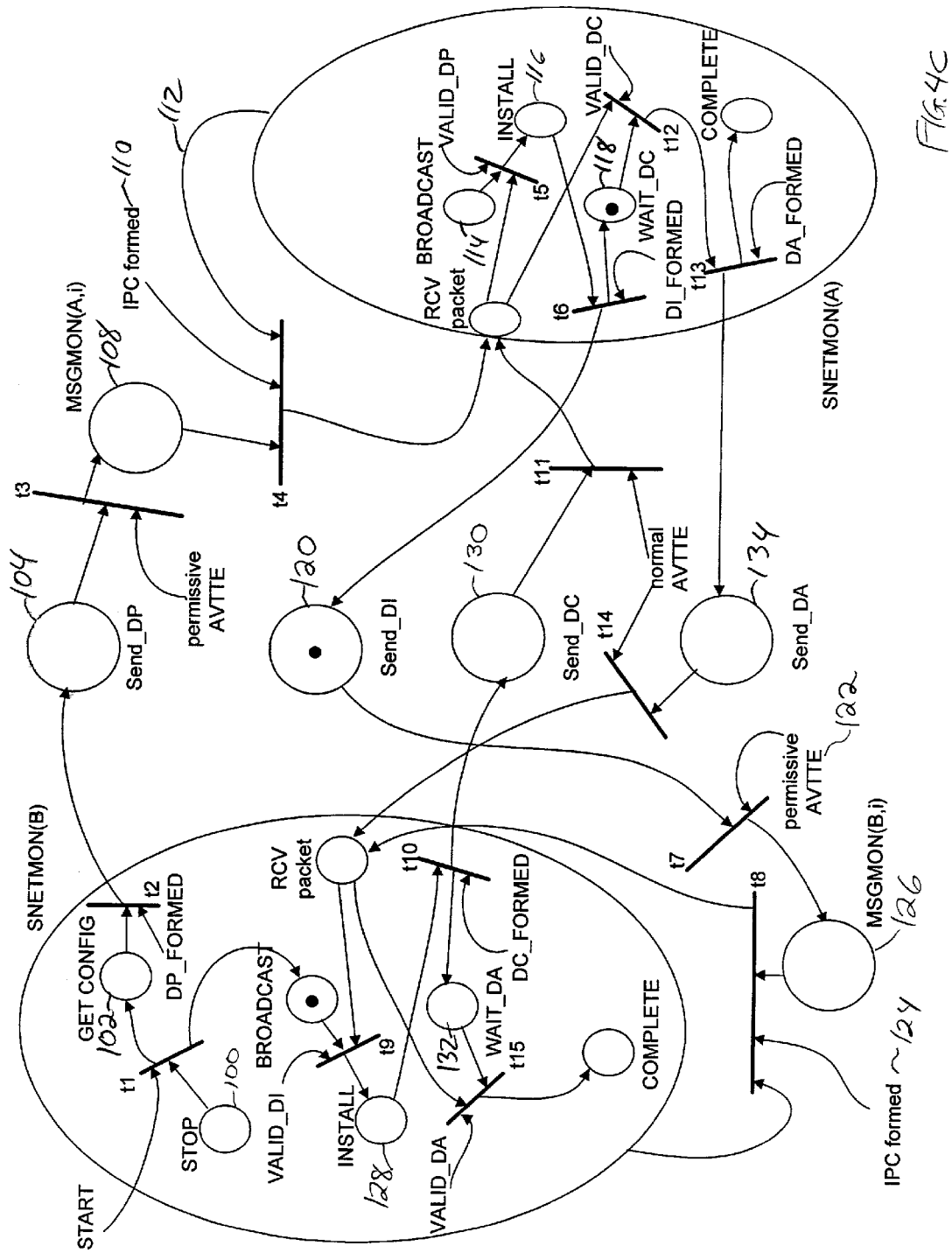

METHOD AND APPARATUS FOR DISCOVERING COMPUTER SYSTEMS IN A DISTRIBUTED MULTI-SYSTEM CLUSTER

CROSS-REFERENCE TO RELATED APPLICATIONS

This application claims priority to an earlier filed U.S. Provisional Application entitled "METHOD AND APPARATUS FOR DISCOVERING COMPUTER SYSTEMS IN A DISTRIBUTED MULTI-SYSTEM CLUSTER", filed on Aug. 31, 2000, Ser. No. 60/229,490, which provisional application is hereby incorporated by reference into the present application.

This application is related to:

Provisional U.S. Application entitled "A CLUSTERED COMPUTER SYSTEM AND A METHOD OF FORMING AND CONTROLING THE CLUSTERED COMPUTER SYSTEM", filed on Aug. 25, 2000, Ser. No. 60/227,899, which application is hereby incorporated by reference into the present application;

Provisional U.S. Application entitled "METHOD AND APPARATUS FOR DETECTING AND REPORTING CONFIGURATION ERRORS IN A MULTI-COMPONENT SWITCHING FABRIC", filed on Apr. 23, 2001, Ser. No. 60/285,936, which application is hereby incorporated by reference into the present application; and Provisional U.S. Application entitled "METHOD AND PROTOCOL FOR ASSURING SYNCHRONOUS ACCESS TO CRITICAL FACILITIES IN A MULTI-SYSTEM CLUSTER", filed on Apr. 23, 2001, Ser. No. 60/286,053, which application is hereby incorporated by reference into the present application.

FIELD OF THE INVENTION

The present invention relates generally to configuring clusters of computer systems and more particularly to dynamically configuring of clusters of multi-processor server nodes and dynamically reconfiguring clusters of multi-processor server nodes in response to a change in the software or hardware of a node or nodes or in the set of nodes that constitute the cluster (i.e., addition or removal of a node or nodes).

DESCRIPTION OF THE RELATED ART

FIG. 1 shows a system setting in which the methods of the present invention are carried out and the apparatus of the present invention reside. The figure shows a cluster of servers 10, 12, 14 (also called nodes), each interconnected by an external switching fabric 16. Each server or node 10, 12, 14 is assigned a unique node number by the external fabric, depending upon its location in the topology of the cluster. The external fabric 16 is formed by high-speed routers and links similar in construction to those defined in the ServerNet architecture. U.S. Pat. No. 5,751,932, issued to Horst, et al., discusses the ServerNet architecture and is hereby incorporated by reference into the present application. The routers in the external fabric are configured with the ability to route packets between the nodes based on a packet field that carries the node number of the destination node. A similar field in the packet contains the node number of the source node for identification of the node where the packet originated.

Each server 10, 12, 14 includes a plurality of processor units 18a–d, 20a–d, 22a–d and I/O devices (not shown) interconnected by an internal switching fabric 24, 26, 28, respectively. The internal fabric 24, 26, 28 of a server or node 10, 12, 14 is formed by high-speed routers and links that are either identical or compatible with the external fabric. When connected together, the internal fabrics 24, 26, 28 of each one of the nodes and the external fabric 16 allow direct, low-latency connectivity between processor units 18a–d, 20a–d, 22a–d and I/O devices in any of the nodes. The routers in the internal fabrics are configured with the ability to route packets to any processor units and I/O devices within a node. The routers in the internal fabrics are also configured to verify the destination node number field in the packets. Packets that are addressed to a different node are sent to the external fabric 16 for proper inter-node routing. Additional fields in the packet uniquely identify the source processor unit or I/O device where the packet originated, and the destination processor unit or I/O device to which the packet should be routed.

In some versions of a server 10, 12, 14, the processor units and I/O devices are interconnected by two independent internal switching fabrics (only one is shown) for fault-tolerance purposes. Packets routed by the external fabric 16 between nodes have a source which is a processor unit or I/O device in one node and destination which is a processor unit or I/O device in a different node.

FIG. 2A shows a representative processor unit 18, a fault-tolerant processor unit, used in the servers of FIG. 1, though the processor unit is not limited to fault-tolerant processor units. In this typical processor unit, there are two processors 52, 53. Processor 52 is connected to a cache 54 and X interface unit 58. Processor 53, a backup processor to processor 52, is connected to cache 55 and Y interface unit 59. Each interface unit 58, 59 give the processor access to a memory store 56, through a memory controller 57, and either of two possible internal fabrics via either link Lx or link Ly.

FIG. 2B shows two servers 10, 14 connected together by an external fabric 16. Each server 10, 14 has an active process called a ServerNet Cluster Monitor Process (SNETMON) 32, 34 and one of the processing units (PSM(A) or PSM(B)) of each server 10, 14 hosts the SNETMON process for the server. The function of the SNETMON process is to establish, monitor, and repair (in the event of a connectivity failure) the direct connections between the processor units of one server and the processor units of the other server. A connection between two processors is a logical concept that signifies that the processors have the ability to exchange messages directly via the fabrics. A processor-to-processor connection is a bidirectional conduit that can be decomposed into a finer granularity logical concept called path. A path represents the set of routers and links used to route a packet from the source to the destination processor. Each connection contains two unidirectional paths between the processors, or four paths in fault-tolerant versions of the servers and the cluster (one path in each direction and in each fabric). In order for a connection to be functional, there must be at least one functional path in each direction between the processors.

An active process, called a Message System Monitor (MSGMON) 36, 38, 40, 42, 44, 46, 48, 50, resides on each processor unit of each server and functions as a communication agent for messages exchanged between the SNETMON process and a particular processor unit.

The establishment of a connection between processor units in different nodes entails exchanging specific information between the processor units. Generally, this information includes: (i) interrupt addresses that allow each processor unit to interrupt the other processor unit when initiating a message or when replying to a message; (ii) barrier addresses which are used during error recovery to verify whether a path to another processor unit is healthy; (iii) probe addresses used for periodic path probing between the two processor units and for testing paths to determine whether connectivity can be repaired after a failure; (iv) processor network IDs (also called ServerNet IDs) which are used for end-to-end packet routing between the processor units of different nodes and contain fields that uniquely identify a node number and a processor number; and (v) processor-specific attributes which allow for optimizing performance of network communications between the two communicating processors. Some attributes are the packetizer type, the processor type, and the processor model.

The above information is exchanged with the assistance of the SNETMON and MSGMON processes of the various nodes in cases such as: (i) when a new node is connected to the cluster; (ii) when a node that was previously connected to the cluster boots or recovers from a power outage; (iii) when the SNETMON process in a node starts, restarts, or migrates to a different processor unit; (iv) when network failures that precluded direct communication between two or more nodes are repaired; (v) when the node number assigned to a node changes due to the node being moved to a different position in the cluster topology; and (vi) when a processor unit in a node is reloaded. The SNETMON processes also exchange node numbers for proper identification of the nodes that form the cluster.

In a small, fixed-configuration cluster, connectivity information that is required to establish connections between remote processors is typically stored in static tables on every node. However, the static tables make it difficult to exchange the connectivity information between nodes in a manner that is scalable, reliable, fast, and amenable to cluster reconfiguration. A monitor process for the local node can query the static tables to establish network connections with processor units hosting remote monitor processes. However, changes to the cluster configuration such as altering node numbers, adding or removing nodes, or adding or removing processor units in a node require updates to all static tables in every node.

Besides keeping such static tables updated, another difficulty is locating remote monitor processes. In the cluster shown in FIG. 1, for example, a SNETMON process could be running in any one of the several processors in each node. In principle, the location of each SNETMON process can be included in the static tables. However, the tables would have to be upgraded whenever an SNETMON has its location changed (e.g., due to changes in the software configuration of a node, or due to migration of the SNETMON process to a different processor unit in response to a process or processor unit failure).

An alternative to the static tables is to employ a service processor (SP) in each node to dynamically retrieve the cluster configuration, at least as far as physical presence of nodes is concerned. The SPs can also dynamically retrieve a limited amount of the cluster connectivity information (specifically, processor ServerNet Ids). This alternative may eliminate some, but not all, of the information that needs to be maintained in the aforementioned static tables. However, for performing dynamic discovery of and connection establishment between processor units, SPs can provide only a limited assistance. Additionally, the completion times for an SP-assisted discovery mechanism are substantially larger than an equivalent SP-less mechanism, because SPs are typically much slower than the host processor units. An SP-assisted discovery mechanism also defeats the architectural goal of independence from SPs (i.e., future servers may not have SPs). Due to the reasons stated above, the SP-assisted discovery mechanism is not an attractive alternative.

While the above methods may be viable (albeit far from ideal) for node discovery in small, fixed-configuration clusters (e.g., comprising two to three nodes), the above methods are not suitable for large clusters for the following reasons. First, reconfiguration at the cluster level (e.g., addition or removal of a node) or at the node level (e.g., addition or removal of processor units) requires a manual update of the static tables on all nodes. Second, changes to processor type/model, or processor memory size require updating all the static tables. Third, a configuration change that moves the SNETMON process to a different host processor unit in a node requires updating the static data tables. Moreover, a hardware or software failure on the processor unit hosting the SNETMON process in a node can potentially disconnect the node from the cluster, until the operator intervenes and updates the static data tables. Fourth, any changes to the cluster imply stopping and restarting the SNETMON processes on all the nodes to force ServerNet connection establishment with the updated contents of the static data tables. Fifth, operator intervention is required to manually update the static tables on all the nodes whenever the configuration of the hardware or the software is altered. This approach is cumbersome and error-prone. Moreover, availability goals mandate quick and robust reconfiguration for the cluster (with ideally zero downtime), which obviously cannot be achieved unless it can be accomplished without operator intervention (or at least with an absolute minimum of operator intervention). Sixth, wrong or missing cluster connectivity information in the static data tables can prevent processor units from establishing direct connections to each other, or cause data corruption (due to usage of incorrect addresses to send packets).

Thus, there is a need for a method and apparatus for configuring and reconfiguring a cluster of nodes and a plurality of processor units within a node that avoids the above mentioned problems of operator assistance, the use of static tables or the use of a service processor.

BRIEF SUMMARY OF THE INVENTION

The present invention is directed towards the above-mentioned need. A method in accordance with the present invention is a method of automatically interconnecting a new node into a cluster of other nodes, where each node includes a plurality of processor units and an internal switching fabric and one of the processor units in each node hosts a monitor process. The method includes the steps of broadcasting a discovery probe (DP) packet from the monitor process in the new node (also called the discovery broadcast node) to each of the plurality of processor units of all the other nodes in the cluster, where the discovery probe packet contains configuration information about the new node. The method further includes receiving at least one discovery probe packet at the monitor process of a discovery initiator node, where the discovery initiator node is one of the other nodes of the cluster. In response to the discovery probe packet, connection information enabling the new node to directly communicate with the monitor process of the discovery initiator node is set up at the discovery initiator node. The method further includes sending a discovery initiator (DI) packet to all of the plurality of processor units in the new node, where the discovery initiator packet contains the connection information set up at the discovery initiator node for the new node, and receiving at least one discovery initiator packet at the monitor process of the new node. In response to the discovery initiator packet, connection information enabling the discovery initiator node to directly communicate with the monitor process of the new node is set up at the new node. The method further includes sending a discovery confirmation (DC) packet directly to the monitor process of the discovery initiator node, where the discovery confirmation packet contains the connection information set up at the new node for the discovery initiator node. In response to the discovery confirmation packet, a discovery acknowledgement (DA) packet is sent directly to the monitor process of the new node.

The DP, DI, DC and DA packets that are sent or received are typically verified before proceeding to take action in response to the packet.

In one embodiment the discovery broadcast packet and the discovery initiator packet are sent via a permissive interrupt mechanism.

One advantage of the present invention is that it provides a discovery mechanism that is fast, reliable and scalable. Typically, the discovery method takes only a few milliseconds to find another node in a fault-free environment. Thus, the cluster configuration need not be kept in static tables because it can be quickly determined at any time.

Another advantage is that the discovery mechanism imposes minimum overhead on the network transmission engines of processor units actively involved in the cluster discovery.

Another advantage is that the discovery mechanism uses system resources judiciously. Resources are not allocated for communication to a remote node until the discovery mechanism provides positive confirmation of that node's presence in the cluster.

Yet another advantage is that the network monitoring process dynamically discovers all the remote nodes when it is started without depending upon any static data.

Yet another advantage is that the discovery mechanism is resilient to hardware failures such as faulty or missing cables, routers, or processor units.

Yet another advantage is that the discovery mechanism is capable of establishing ServerNet connectivity between the processor units running the monitoring process, such as the SNETMON process, despite changes to the configuration of a node such as migration of the SNETMON process to a different processor unit, ServerNet node number changes, processor upgrades, including processor type/model and processor memory upgrades, online expansion or reduction of the node (i.e. addition and deletion of processor units), software upgrades, including newer versions of the operating system, the SNETMON process, and/or message receiving processes in the processor units, such as MSGMON processes.

Yet another advantage is that software errors such as missing (or slow) MSGMON processes do not prevent discovery of a remote node.

Yet another advantage of the present invention is that, after the initial discovery mechanism completes, the SNETMON process continues to attempt to discover nodes. Background discovery is typically performed at less frequent intervals than the initial rounds of discovery. Background discovery ensures that any nodes that could not be discovered by the initial discovery mechanism, perhaps due to a larger than tolerable number of failures in the cluster, are eventually discovered after a minimum amount of necessary repair is accomplished.

Yet another advantage is that cluster reconfiguration requires a minimum of operator intervention as far as ServerNet connectivity establishment/repair is concerned. Operator intervention is limited to ensuring that the SNETMON process in each node is configured to automatically broadcast any cluster updates or configuration changes to all the appropriate nodes.

Yet another advantage is that the discovery mechanism works across system cold load (which is typically required when the operating system of a node is upgraded), cluster reconfiguration leading to one or more node number changes, and power fail recovery of one or multiple nodes in the cluster.

BRIEF DESCRIPTION OF THE DRAWINGS

These and other features, aspects and advantages of the present invention will become better understood with regard to the following description, appended claims, and accompanying drawings where:

FIGS. 4A–4F are more detailed step-by-step diagrams of the discovery method in accordance with the present invention.

DETAILED DESCRIPTION OF THE INVENTION

Figure 3A:
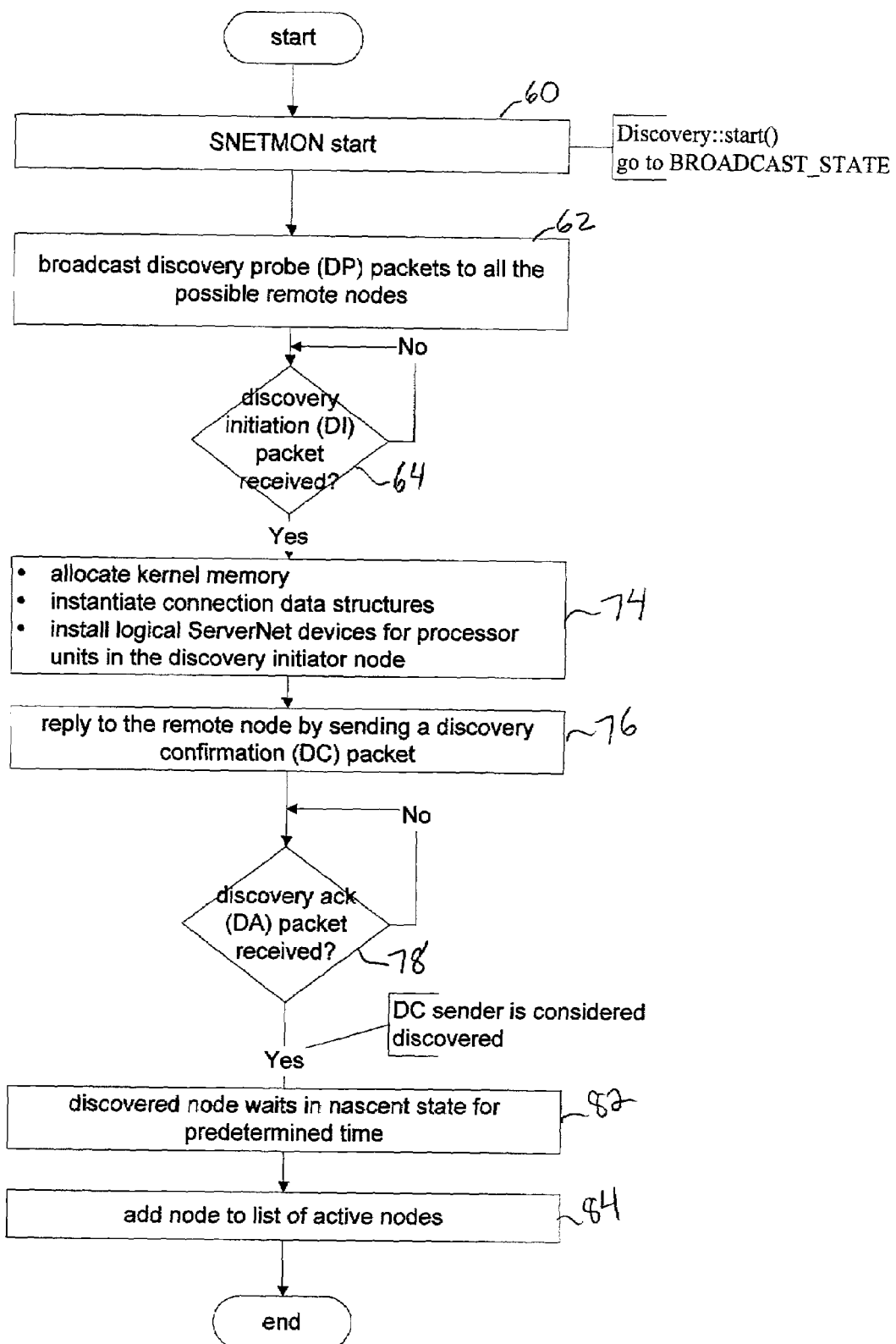
FIGS. 3A and 3B are flow charts depicting a method in accordance with the present invention.
Figure 3B:
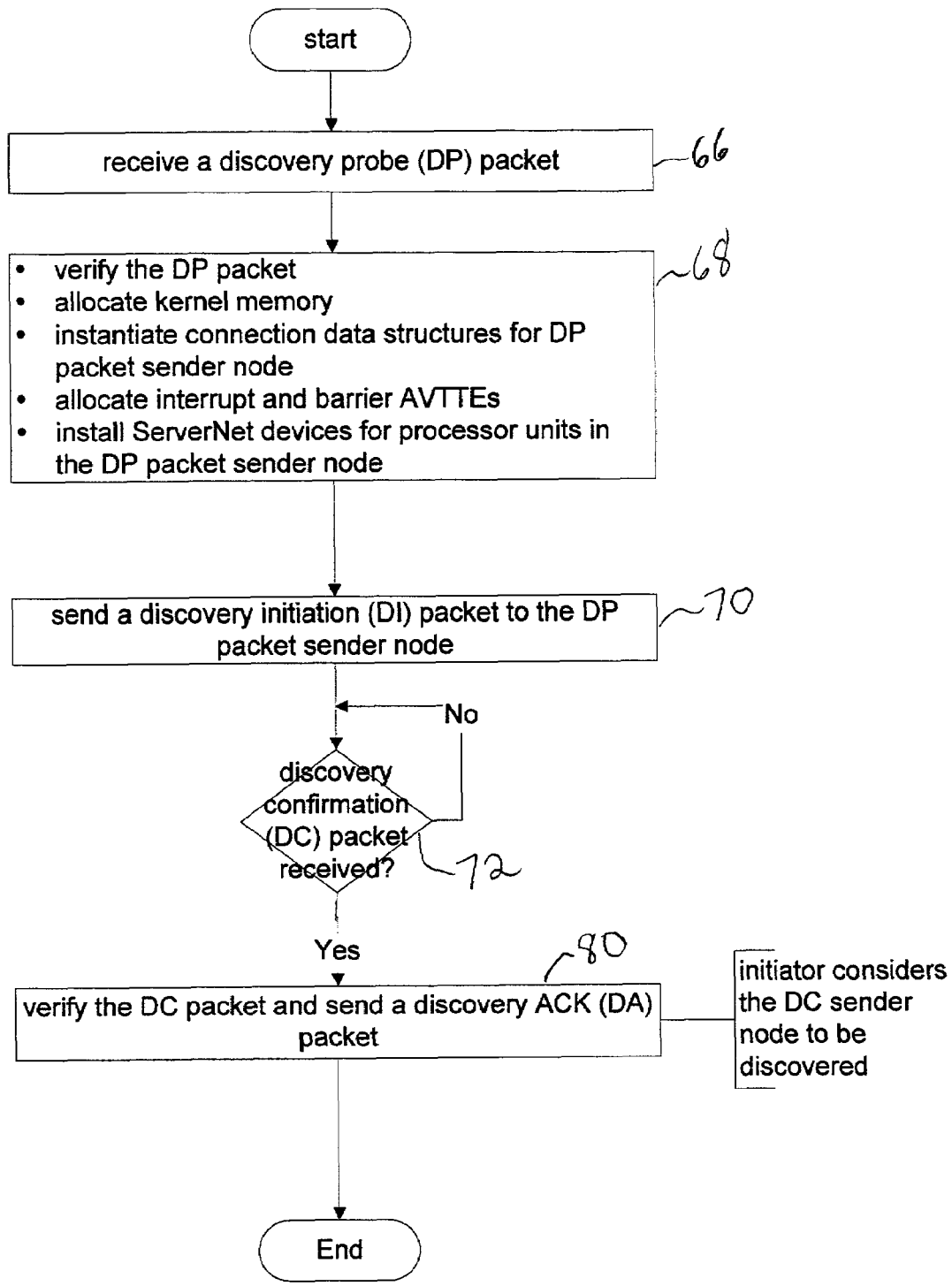

FIGS. 3A and 3B are flow charts depicting a method in accordance with the present invention. FIG. 3A shows the steps that a discovery broadcast node takes in the method and FIG. 3B shows the steps that a discovery initiator node takes in the method. It should be noted at this point that while the protocol is described as occurring between two nodes, the discovery broadcast node and the discovery initiator node, multiple instances of the protocol can occur concurrently in a cluster having two or more nodes. For example, if there are three existing nodes in a cluster and a new fourth node is joining the cluster, the new node acts as a broadcast discovery node and each other node acts as a broadcast initiator node to the new node. This means that, in this example, there are three concurrent instances of the protocol occurring in the cluster. Thus, while the discussion focuses on two nodes, this focus is taken only to simplify the discussion and not as a limitation.

Referring to FIG. 3A, upon receiving a start command in step 60, the SNETMON process in the discovery broadcast node broadcasts, in step 62, Discovery Probe (DP) packets to all possible remote nodes in a cluster. A DP packet contains configuration parameters of the discovery broadcast node. After the broadcast by the discovery broadcast node, that node then waits, in step 64, for discovery initiation (DI) packets from other nodes to be received.

Referring now to FIG. 3B, the discovery initiator node receives, in step 66, and then verifies the DP packet, in step 68. If the DP packet is valid, the SNETMON process in the discovery initiator node then performs, in step 68, a number of software operations on behalf of the discovery broadcast node. These operations include (i) setting up kernel data structures for the discovery broadcast node that store relevant information for the logical connectivity with that node; (ii) allocating blocks of interrupt and barrier addresses for all of the configured processor units in that node; (iii) installing logical network devices for all configured processor units in that node; and (iv) formatting a Discovery Initiation (DI) packet to send to the discovery broadcast node. The DI packet is then sent, in step 70, to the Discovery Broadcast node. The DI packet contains local information about the discovery initiator node, similar to the contents of the DP packet, along with starting addresses of the blocks of the interrupt and barrier addresses that were allocated. The discovery initiator node then waits, in step 72, for a discovery confirmation (DC) packet.

Returning to FIG. 3A, the discovery broadcast node receives, in step 64, the DI packet and then performs, in step 74, the following software operations on behalf of the discovery initiator node. These operations include (i) setting up kernel data structures for the discovery initiator node; (ii) allocating blocks of interrupt and barrier addresses for all configured processor units in that node; (iii) installing a logical network device for the processor that hosts the SNETMON process for that node; (iv) formatting a Discovery Confirmation (DC) packet which contains the starting addresses of the blocks of interrupt and barrier addresses that were allocated by that node on behalf of the discovery initiator node. The DC packet is then sent, in step 76, to the discovery initiator node after which the Discovery Broadcast node waits, in step 78, for the Discovery Acknowledge (DA) packet.

The Discovery Initiator node, in FIG. 3B, receives, in step 72, and verifies, in step 80, the DC packet having the starting addresses of the blocks of interrupt and barrier addresses allocated by the Discovery Broadcast node for the Discovery Initiator node, which completes the configuration of the logical network device that the Discovery Initiator node installed for the Discovery Broadcast node.

At this point there is a fully functional, bidirectional network connection between the processor units that host the SNETMON processes in each of the nodes and the Discovery Broadcast node is considered to be "discovered."

The Discovery Initiator node then formats a Discovery Acknowledge (DA) packet and sends, in step 80, the DA packet back to the Discovery Broadcast node which then transitions, in step 82, to a nascent state in which it waits for a predetermined time. At the end of the predetermined time, the Discovery Broadcast node is added, in step 84, to a list of active nodes.

Thus, in summary, a Discovery Broadcast node starts the discovery method by sending a DP packet. The Discovery Initiator node receives the DP packet and after installing network devices for the processor units in the Discovery Broadcast node, sends a DI packet to the latter node. The Discovery Broadcast nodes receives the DI packet and performs similar network device installation for the Discovery Initiator node after which it sends a DC packet to the Discovery Initiator node. Upon receiving the DC packet, the Discovery Initiator node completes its installation of the logical network device and sends a DA packet back to the Discovery Broadcast node, which completes the discovery process.

In this exchange of packets, the DP and DI packets are delivered via a special permissive interrupt mechanism described below. Instead of the SNETMON process receiving these packets directly, these packets are received by the processor units' MSGMON processes and forwarded by those processes to the SNETMON process on the node. The reason that a permissive interrupt mechanism is used is that the processor units in the Discovery Initiator node do not have preestablished connections to the processor units in the Discovery Broadcast node, and vice-versa. This causes the packets to be rejected by the normal interrupt mechanism. To avoid this problem, the DP and DI packets are delivered to each processor in the node which receives these packets via an interrupt mechanism that is capable of receiving interrupt packets from any source processor in the cluster. The MSGMON process of the receiving processor units then uses an Interprocess Communication (IPC) message to forward the packet to the SNETMON process of the node. More details about the preferred IPC mechanism can be found in U.S. Pat. No. 5,915,088, which application is hereby incorporated by reference into the present application.

After a node is considered discovered, the ServerNet connection to that node is assumed to be in a nascent state. It is possible that, in the nascent state, duplicate or late DP, DI, DC, or DA packets may be received by a node, due to retries or slower communication pathways. For example, DP and DI packets are delivered via a permissive interrupt mechanism, and must be forwarded by a MSGMON process to the SNETMON process. DP and DI packets are typically sent to multiple processors on the remote node. A MSGMON running on a busy processor may not be scheduled to run immediately when a DP or DI packet is received. Consequently, it is possible that when the slow MSGMON process has a chance to run and forward the packet to SNETMON, the packet would have been substantially delayed and be considered stale by that SNETMON. This is possible if a DP or DI packet forwarded by another faster MSGMON had allowed the discovery protocol to proceed to a state whereby a delayed DP or DI packet from the remote node is no longer expected. The node may also retry sending the various types of discovery packets, in case an expected response packet is not received in a timely fashion. Retries create the possibility of duplicate packets being received at a node. To facilitate the detection and discarding of duplicate packets, all of the discovery packets (DP, DI, DC, and DA) carry a 64-bit timestamp.

Any DP, DI, or DA packets received when the connection to the remote node is in nascent state are simply discarded. The connection will remain in nascent state for NASCENT_CONNECTION_TICKS (typically 5 seconds). This allows the discovery protocol to quiesce and achieve a stable state. Handling DP, DI, or DA packets while the connection is nascent must be avoided, otherwise the discovery protocol may be restarted unnecessarily. During the nascent state, however, DC packets are ACKed since these could be legitimate retries initiated by the other node (the other node would not have considered the discovery to be complete in that case, because it may not have received a DA packet). Note that reception of a discovery ACK (DA) packet by the node completes the protocol on that node.

After NASCENT_CONNECTION_TICKS timer ticks, the ServerNet connection to the newly discovered node is considered stable. No more stale or late discovery packets are expected at this point. The discovered node is added to a list of active nodes. Discovery packets from an active node are not expected, unless there are communication failures between the two SNETMON processes, or migration of one of the SNETMON processes to a different processor location. The discovery protocol will be restarted in those cases to reconstruct the connection between the SNETMON processes. Any DP packets received after the connection has stabilized are regarded as a fresh attempt to reinitiate discovery, and will cause the discovery protocol to be restarted.

As mentioned above, the DP and DI packets are delivered via a permissive interrupt mechanism. The reason for this is that a fully functional, bidirectional ServerNet connection between two processor units requires interrupt and barrier Access Validation and Translation (AVT) Table Entries (AVTTEs) with access permissions granted to each one of the other processor units. These AVTTEs are not allocated until the ServerNet connection between the two processor units is established and thus cannot be used for the DP and DI packets. Therefore, a permissive interrupt AVTTE mechanism is used, in accordance with the present invention, to ensure that the two processor units can mutually exchange interrupt and barrier AVT addresses. The AVT mechanism is part of the ServerNet architecture and is discussed in the previously mentioned U.S. Pat. No. 5,751,932.

The permissive interrupt AVTTE mechanism is implemented in every processor unit in the cluster. The permissive interrupt AVTTE has a well-known AVT address and accepts incoming interrupt packets sent from any processor unit in the cluster. Packets, such as DP and DI, that are received via the permissive AVTTE mechanism are referred to as permissive interrupt packets and each permissive packet carries an identifier code that identifies the intended listener for the packet. The listener is typically a dedicated process that registers with the operating system to handle incoming permissive interrupt packets. In the present invention, the MSGMON process is the listener responsible for handling permissive interrupt packets and every processor unit in the cluster runs a local copy of the MSGMON process. Permissive interrupt packets sent by the discovery mechanism have a unique identifier code that indicates to the receiving processor unit that the packet is intended for the MSGMON process.

FIGS. 4A–4F are more detailed step-by-step diagrams of the discovery method in accordance with the present invention. The networks depicted in FIGS. 4A–4F operate according to the following rule: a transition (solid bar) is enabled if there is a token (a dot) in each of its input places (circles). An enabled transition fires, removing the token from each input place and depositing a token in each output place. The following nomenclature is used in the discussion of FIGS. 4A–4F.

Node A—First node connected to the external fabrics of the cluster.
SNETMON(A)—SNETMON process running on node A.
MSGMON(A,i)—MSGMON process running on processor unit i in node A. In one embodiment, i can range from 0 to 15. Note that this invention is not limited to multiprocessor nodes having a maximum of 16 processor units. Those skilled in the art this invention relates to can readily recognize that the invention can also be used in multiprocessor nodes having more than 16 processor units.
PSM(A)—The processor unit hosting SNETMON process SNETMON(A). The processor number hosting the SNETMON process need not be fixed and a priori is not known by the other nodes.
PMM(A,i)—The processor unit hosting MSGMON process MSGMON(A,i).
Node B—Node connected to the external fabrics of the cluster after node A is connected.
SNETMON(B)—SNETMON process running on node B.
MSGMON(B,i)—MSGMON process running on processor unit i in node B.
PSM(B)—The processor unit hosting SNETMON process SNETMON(B).
PMM(B,i)—The processor unit hosting MSGMON process MSGMON(B,i).

Thus, it is assumed for purposes of discussion that node A is already connected to the external fabric of the cluster and that node B must be discovered, i.e., SNETMON(B), the SNETMON process in node B, is unaware of the cluster configuration. It must dynamically query all the possible remote processors and determine the cluster configuration. Thus Node B is the Discovery Broadcast node and Node A is the Discovery Initiator node.

A local SNETMON process is assumed capable of retrieving its own node number, regardless of the presence of other remote nodes in the cluster. This is accomplished by querying the external fabric of the cluster as follows. A special fabric management packet is sent to the nearest router the node is connected to, on each of the available external fabrics. The nearest router on the external fabric replies to this packet informing the node of its assigned node number. Each node connected to the external fabric is assigned a unique node number depending upon its location in the cluster topology.

Figure 4A:
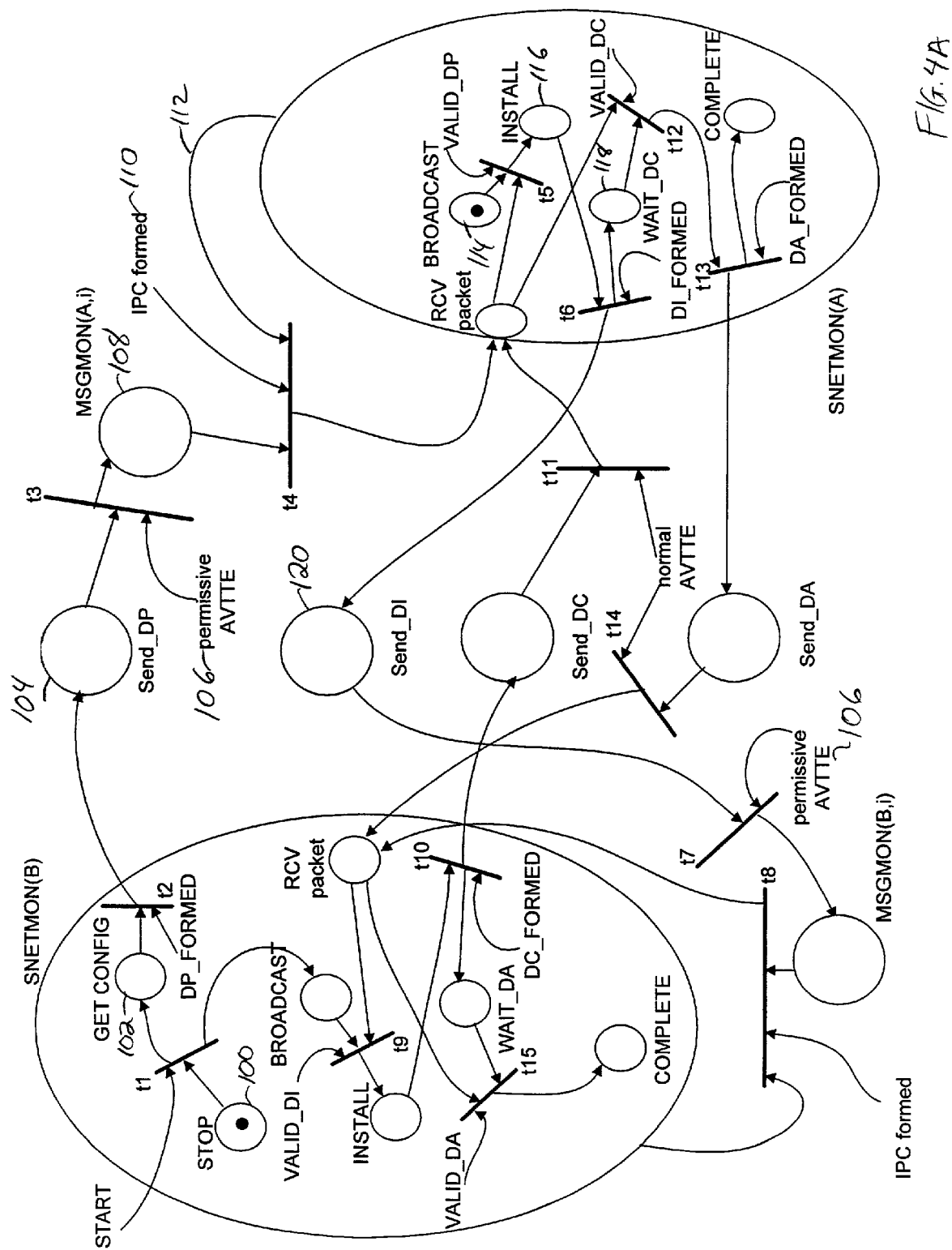

FIG. 4A shows the starting condition. The Broadcast node is in the STOP state 100 as indicated by the presence of a token in that state. When a START command arrives, transition t1 fires. The START command is either an operator START command or a configurable automatic START option.

After transition t1 fires, the GET_CONFIG state 102 is reached. In the GET_CONFIG state 102, SNETMON(B) dynamically retrieves the following locally available configuration parameters:
Node number assigned to node B;
Processor number of the processor unit PSM(B) in which SNETMON(B) is running;
Type and model of the processor unit PSM(B);
Type of ServerNet packetizer that is present in the processor unit PSM(B);
Maximum number of configured processors in node B; and
Version of the cluster discovery protocol software implemented by SNETMON(B).

The above local configuration parameters for node B are then assembled in a packet referred to as a Discovery Probe (DP) packet. Once the DP packet is formed, then transition t2 is triggered, resulting in the Send_DP state 104.

Figure 4B:
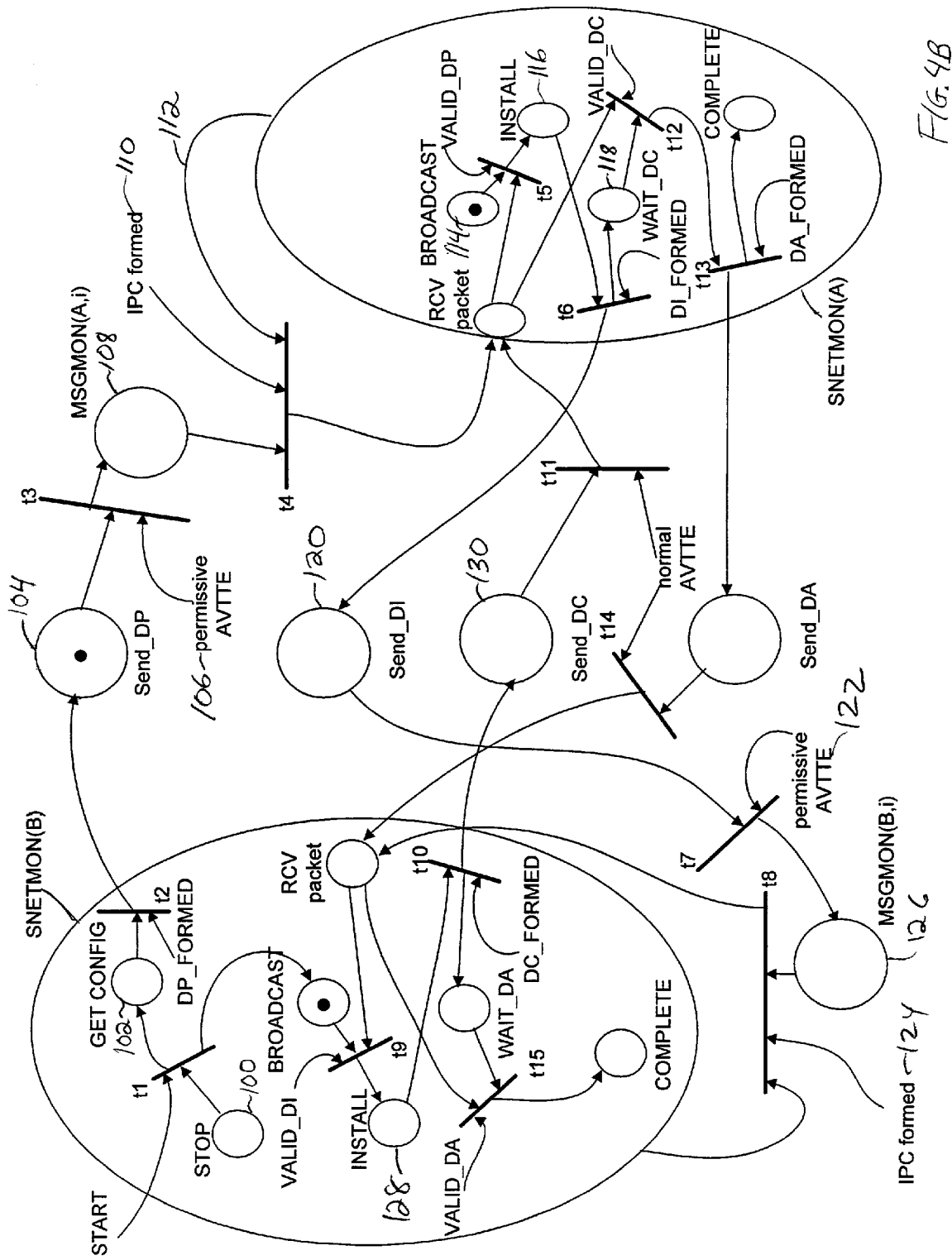

FIG. 4B shows the Send_DP state 104 in which the DP packet is broadcast by SNETMON(B) to all possible remote processors over all available fabrics. In essence, DP packets represent requests sent by SNETMON(B) to instigate peer SNETMON processes in remote nodes to initiate an exchange of discovery packets, with the ultimate goal of establishing direct ServerNet connections.

A permissive AVT Table Entry (AVTTE) 106 allows transition t3, in FIG. 4B, to fire and the DP packet to be received by the MSGMON (A, i) process 108 in each processor unit. The MSGMON process 108 in each processor unit will then forward the DP packet to the SNETMON process on node A via a local InterProcess Communication Message (IPC) 110. This is shown in FIG. 4B as the firing of transition t4, which requires that MSGMON 108 has received the DP packet, that the IPC message 110 has been formed by the MSGMON process and that the SNETMON process 112 is running. If the SNETMON process is not running on node A, then MSGMON(A, i) 108 logs an error message and the DP packet is discarded because an active SNETMON process is required on node A for successful completion of the discovery method between nodes A and B.

The receipt of the DP packet by SNETMON(A), which is in the BROADCAST state 114, causes transition t5 to trigger, if the DP packet is verified as valid. The DP packet is checked by SNETMON(A) for potential errors such as:

SNETMON(A) is running, but is not configured to allow active participation of node A on the cluster;

Duplicate node numbers between A and B;

Version incompatibility between the cluster discovery protocol software on nodes A and B;

Mismatch between the ServerNet ID reported by the receiving ServerNet hardware in node A as the source of the DP packet and the node number and processor number claimed by SNETMON(B) in the DP packet data payload; and Invalid or unsupported fields in the DP packet.

The DP packet is discarded if one or more of the above errors are detected, and an error message is generated on node A to log the discovery protocol failure.

If the DP packet is valid, then SNETMON(A) considers that node B is an active member of the cluster and the INSTALL state 116 in SNETMON(A) is reached. The INSTALL state 116 is a state in which a number of software activities on behalf of node B are performed by node A. These include:

Instantiate dedicated kernel data structures for node B.

These data structures store relevant information for logical connectivity with node B (including for example ServerNet connectivity information received from node B). Such information is stored in kernel memory (as opposed to external storage such as a magnetic disk or tape) due to performance considerations. That is, once the connectivity with node B is established, the information stored on kernel data structures for node B tend to be accessed frequently whenever messages are exchanged between nodes A and B.

Allocate blocks of contiguous ServerNet interrupt and barrier AVT addresses for all configured processor units in node B.

Install logical ServerNet devices for all configured processor units in node B.

At this point, partially functional ServerNet connections are established by processor unit PSM(A) on behalf of the remote processor units in node B. More specifically, PSM (A) is capable of receiving regular interrupt packets from any processor in node B. However, PSM(A) can not send regular interrupt packets to processors in node B yet, because node B has not allocated connection resources for node A. This is an intended behavior, because node B expects positive confirmation that node A is an active member of the cluster before it allocates resources for node A. Such positive confirmation will be provided when node A subsequently sends a Discovery Initiation (DI) packet to node B.

Next, the SNETMON(A) process formulates a DI packet, which is a permissive interrupt packet that contains local configuration information for node A (similar to what was sent in the DP packet to node A), and the base addresses of the blocks of interrupt and barrier addresses that were allocated by PSM(A) on behalf of the processor units in node B.

Once the DI packet is formed, transition t6 fires changing the SNETMON(A) state to WAIT_DC 118 and causing the process to move to the Send_DI state 120, as shown in FIG. 4C. Because the DI is a permissive packet, it is sent to all of the processor units in node B. This is shown in FIG. 4C by the t7 transition, which is enabled by a permissive interrupt AVTTE 122. However, an optimization is preferably performed by sending the DI packet initially to the MSGMON (B,i) 126 on the PSM(B) processor unit. That MSGMON forwards the permissive packet to the SNETMON(B) process on that same processor via an IPC message. The reason for this optimization is that the latency of an IPC message is smaller for processes communicating on the same processor unit. This optimization is backed up by sending the DI packet to all of the other processor units in node B so that if the MSBMON(B,i) of PSM(B) is not running, fails to receive the DI packet or fails to forward the packet, the DI packet will still arrive at the SNETMON(B).

After the IPC message 124 is formed and the permissive DI packet is forwarded to SNETMON(B), i.e., after the firing of t8, the DI packet is verified. This verification includes checking similar to that for the DP packet as well as validation of the starting ServerNet interrupt and barrier AVT addresses conveyed in the DI packet. Detected errors cause the discovery protocol to fail and an error message is logged.

If the DI packet is valid, then SNETMON(B) considers node A to be an active member of the cluster and transition t9 fires causing the INSTALL state 128 in SNETMON(B) to be reached. The INSTALL state 128 in SNETMON(B) performs similar software activities to the INSTALL state 116 of SNETMON(A) described above. In particular, the following activities on behalf of node A occur:

Instantiate dedicated kernel data structures for node A;

Allocate blocks of contiguous ServerNet interrupt and barrier AVT addresses for all configured processor units in node A;

Install a logical ServerNet device for the processor unit PSM(A).

At this point, the steps required on PSM(B) to establish a fully functional ServerNet connection to PSM(A) are complete. PSM(B) is capable of receiving regular interrupt packets from PSM(A). The same is not true for the connection as viewed from PSM(A) because PSM(A) has not received base interrupt and barrier addresses from SNETMON(B). This means that PSM(A) cannot send regular interrupt packets to PSM(B) though it can receive such packets from PSM(B).

Figure 4D:
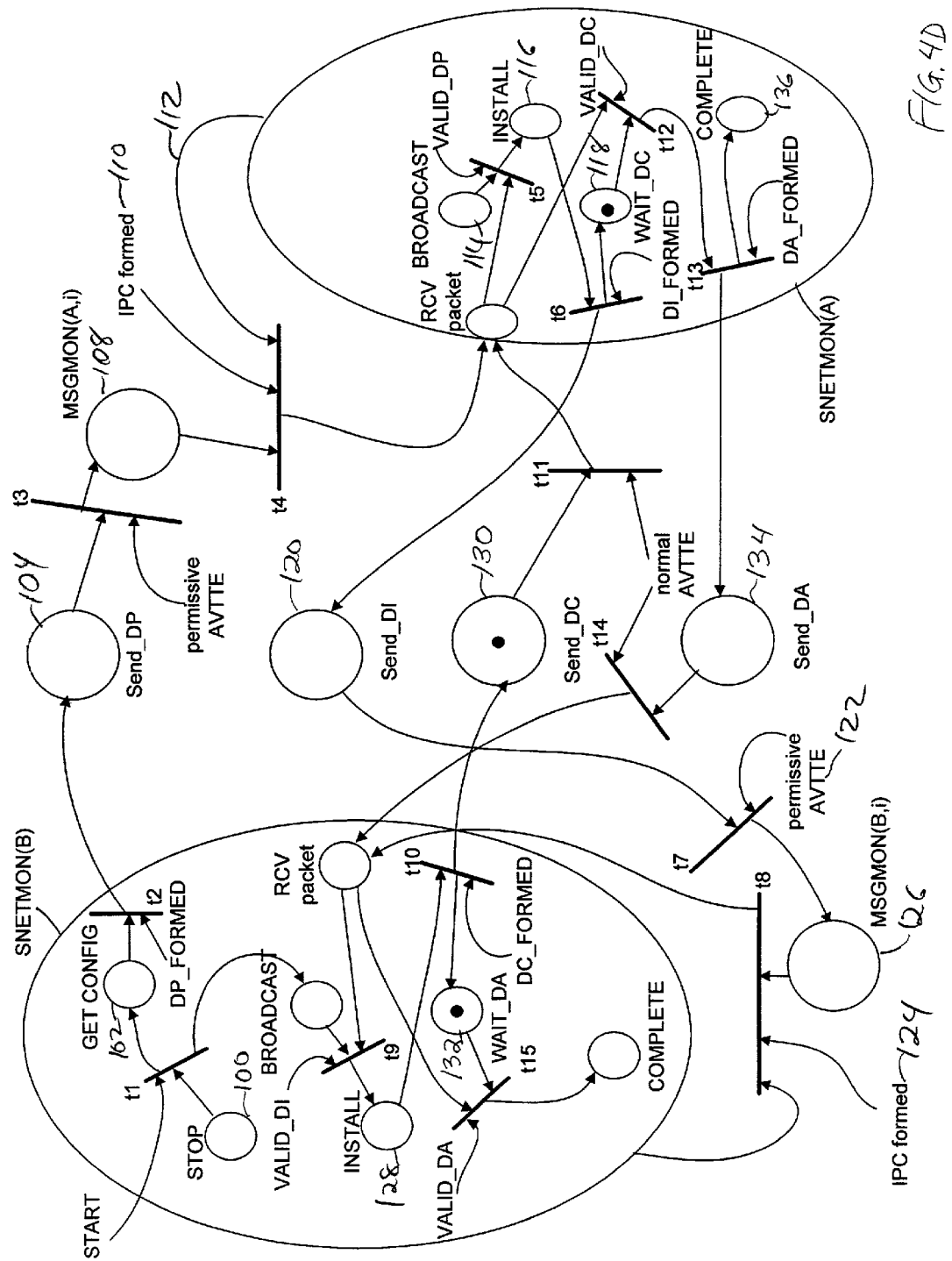

The next step is to formulate a DC packet, which is a regular interrupt packet. This packet contains what the PSM(A) node is waiting for, namely, the base addresses of the blocks of interrupt and barrier addresses that were allocated by PSM(B) on behalf of the processor units in node A. Transition t10 fires to cause the Send_DC state 130 in FIG. 4D to be reached and SNETMON(B) enters the WAIT_DA state 132. The DC packet is sent directly to the PSM(A) unit because the DC packet is a regular interrupt packet which can be handled by a regular interrupt handler and directed to a generic destination process (SNETMON (A) in this case). This is shown in FIG. 4D by the t11 transition.

SNETMON(A) now verifies the DC packet sent by SNETMON(B) at transition t12 and if the packet is valid, SNETMON(A) performs the following activities. The addresses contained in the DC packet are used to complete the configuration of the logical ServerNet device that PSM (A) had installed for processor unit PSM(B) in the INSTALL state 116 of SNETMON(A).

At this point a fully functional, bi-directional ServerNet connection between processor units PSM(A) and PSM(B) is established.

Figure 4E:
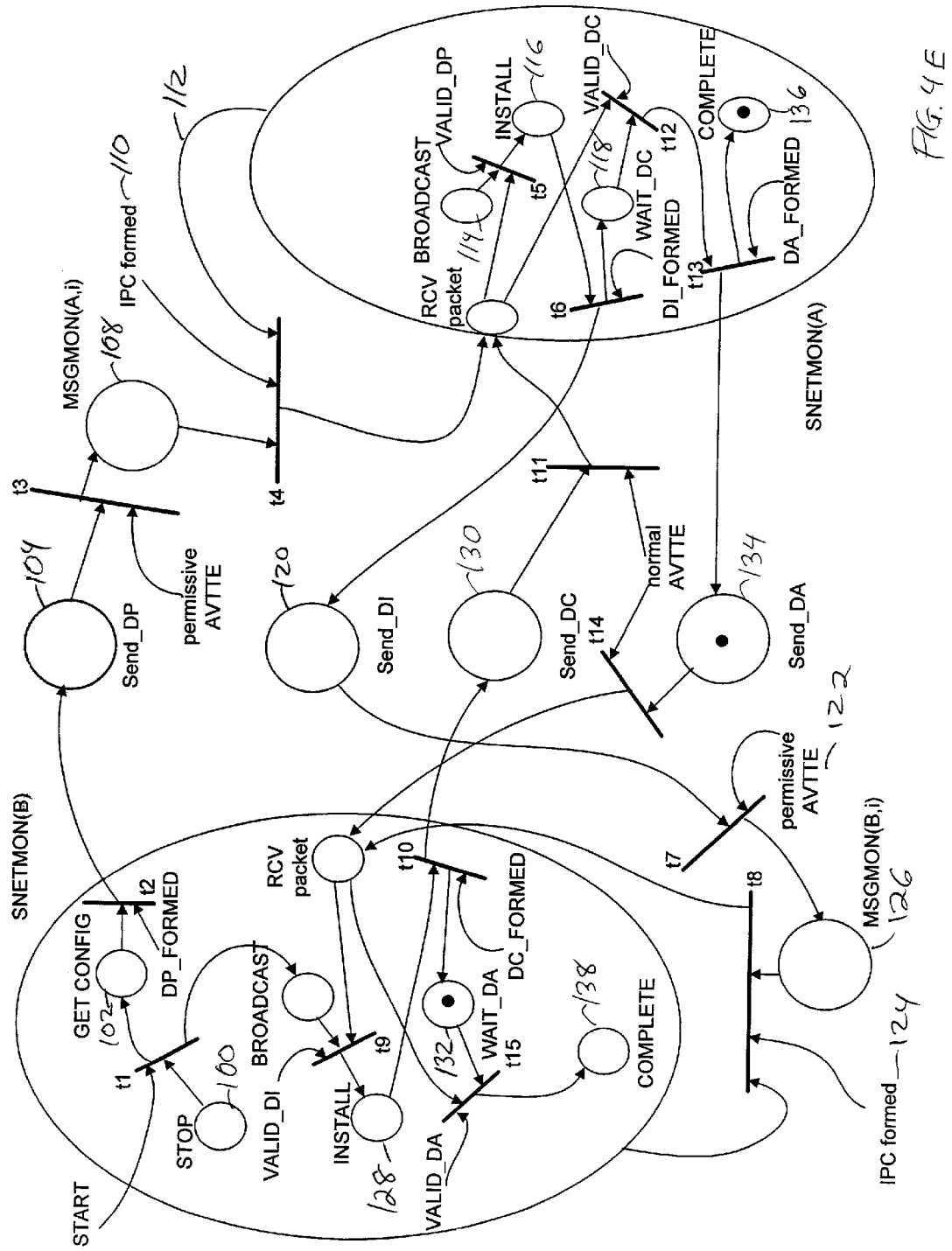
Figure 4F:
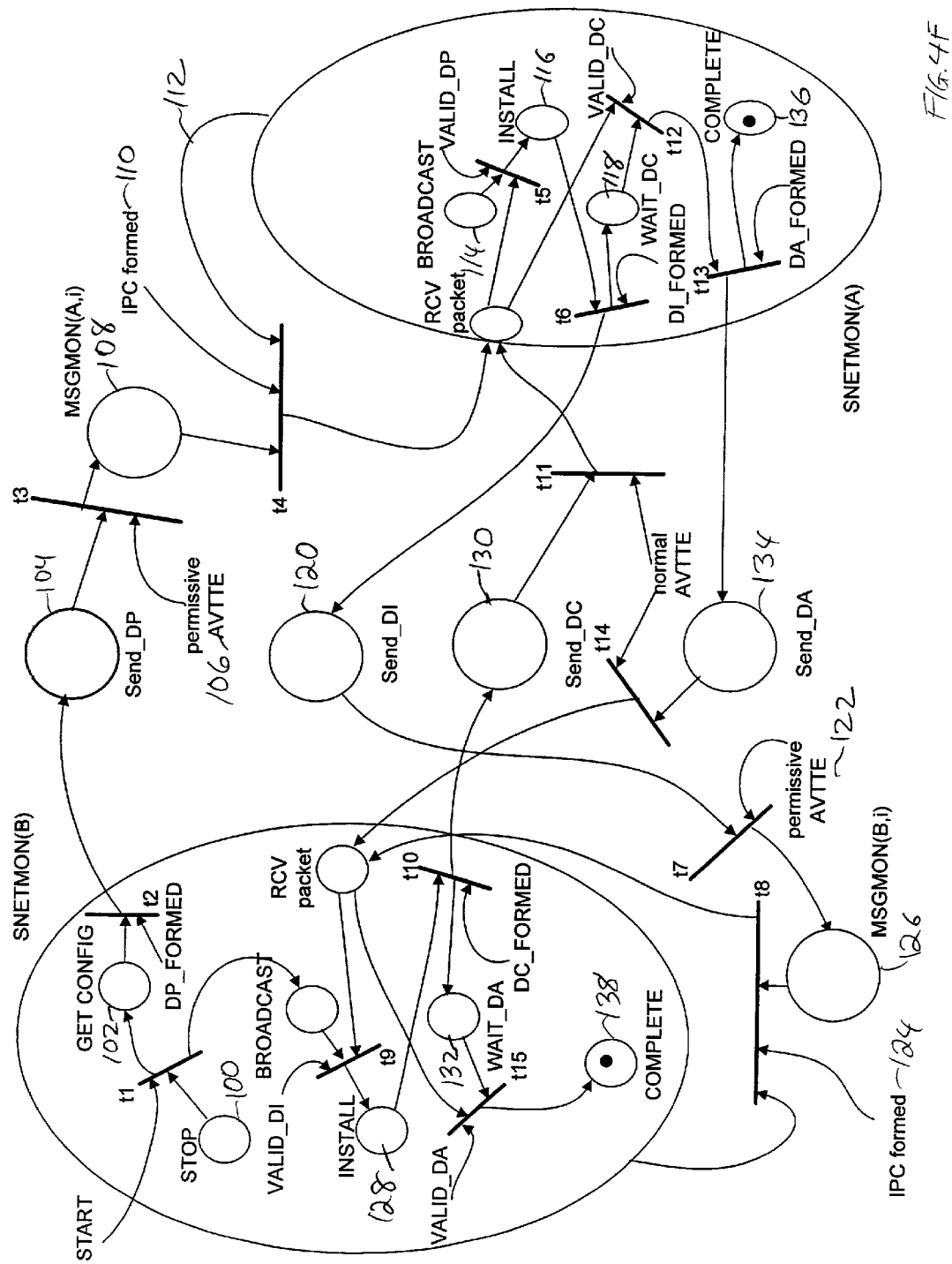

A final packet completes the protocol. The valid DC packet and the formation of a DA packet causes transition t13 to fire, thus reaching the send_DA state 134 and the COMPLETE state 136 in the SNETMON(A) node as shown in FIG. 4E. The DA packet is sent directly to the PSM(B) that hosts SNETMON(B) via a normal AVTTE interrupt, transition t14. SNETMON(B) then verifies the DA packet and transitions in t15 to the COMPLETE state 138 as shown in FIG. 4F. SNETMON(B) now considers node A to be successfully discovered.

Once a fully functional, bidirectional ServerNet connection between processor units PSM(A) and PSM(B) is established, SNETMON(A) can instruct the MSGMON processes running in other processor units in node A to allocate memory and ServerNet resources for processor units in node B.

Similarly, SNETMON(B) can instruct the MSGMON processes running in other processor units in node B to allocate memory and ServerNet resources for processor units in node A. The MSGMONs reply with ServerNet connectivity information (e.g., interrupt and barrier addresses) resulting from their allocations. The communication between a SNETMON process and the MSGMON processes of the same node uses InterProcess Communication (IPC) messages.

Additionally, the two SNETMON processes cooperate to exchange the ServerNet connectivity information for the processor units in nodes A and B via the ServerNet connection constructed by the discovery mechanism. Each SNETMON process subsequently propagates the ServerNet connectivity information received from a different node's SNETMON process to all of the processor units of its node. This mechanism establishes ServerNet connections for those processor units that are not running a SNETMON process.

The description of the above discovery protocol assumes that node B is added to the cluster after node A. This assumption is used merely to simplify the description of the protocol. The order in which the nodes start the discovery mechanism is not relevant for the correct operation of the invention.

It is possible however to encounter the case where nodes A and B are simultaneously added to the cluster. For example, suppose that nodes A and B are each new nodes being added to a cluster having three existing nodes. Between node A and the other three existing nodes, node A acts as a discovery broadcast node and the other nodes act as discovery initiator nodes. Similarly, between node B and the other three existing nodes, node B acts as a discovery broadcast node and the other nodes act as discovery initiator nodes. However, between nodes A and B, each node is both a discovery broadcast node and a discovery initiator node. In this case, DP packets sent from node A to node B, and from node B to node A, may cross each other. The above-described discovery protocol operates correctly in this case. However, a simple optimization is used to avoid the extra processing and communication overhead when concurrent discovery protocols operate. The optimization includes employing a tiebreaker rule which is that the node with the smaller node number, say A in the example given, assumes the discovery initiator role. That is, this node replies with DI packets, and moves the discovery protocol state to WAIT_DC_PACKET. Conversely, the node with the greater node number, say node B in the example given, retains the discovery broadcast role. This node then waits for a DI packet, and maintains the discovery protocol state in BROADCAST_STATE. The opposite tiebreaker rule (i.e., having the node with the greater node number assume the discovery initiator role) works equally well. The tiebreaker rule only operates with respect to the protocol between nodes A and B. Otherwise, it has no effect on other instances of the protocol operating concurrently in the cluster.

The above protocol described a successful discovery between two nodes A and B in the cluster. There are several failure conditions that need to be addressed.

First, if node B fails to discover any other node in the cluster, node B logs an error message that indicates no remote nodes were discovered.

Second, if B fails to discover all of the possible other nodes in the cluster, node B logs an individual error message for each remote node that failed to be discovered. An individual error message provides detail on the discovery failure with respect to the other node. Types of errors include (i) ServerNet transmission errors and (ii) remote node fails to reply with an expected response, after having received a packet.

The first case can occur when: (i) the other node is disconnected from the cluster; (ii) the other node is powered off; (iii) the other node is powered on but has not been cold loaded yet; or (iv) failures on both ServerNet fabrics preclude discovery of the remote node.

The second case can occur when: (i) a SNETMON process is not running on the other node; (ii) a SNETMON process is running on the remote node, but it has not been configured to allow active membership of that node in the cluster; or (iii) the discovery packets sent by the node failed verification checks performed in the other node.

In addition, the discovery protocol itself may fail at any stage due to such causes as: (i) failure of one of the SNETMON processes; (ii) failure of a processor unit running one of the SNETMON processes; (iii) migration of one of the SNETMON processes to a different processor unit; (iv) termination of one of the SNETMON processes by the operator; (v) failure of one of the nodes; (vi) disconnection of one of the nodes from the cluster; (vii) a power outage on one of the nodes; (viii) movement of one of the nodes to a different position in the cluster topology, causing its node number to be changed; and (ix) ServerNet hardware failures.

Failure reporting is based on the following assumptions. If an expected response to a permissive discovery packet, such as a DP or DI packet, which is sent to all processor units in the other node, is not received from the other node, discovery of that other node is considered to have failed. If an expected response to a regular interrupt packet, such as DC or DA (which is sent only to the processor unit hosting SNETMON), is not received after a maximum number of retries performed at regular intervals has occurred, the discovery of the other node is considered to have failed.

Regardless of the stage of the discovery protocol in which the failure occurred, the SNETMON process logs a detailed error message, and the background discovery mechanism subsequently continues to attempt to discover the remote node. The error message includes the discovery protocol stage in which a failure was detected. The possible discovery protocol stages are:

Broadcast stage—This is reported if a failure is detected when the node was sending a DP packet, or when an incoming DP packet received by the node is discarded (due to reasons such as a packet verification failure, an absent SNETMON process, or an inactive SNETMON process).

Initiation stage—This is reported if a failure is detected when the node was sending a DI packet, or when an incoming DI packet received by the node is discarded (due to reasons such as a packet verification failure, an absent SNETMON process, or an inactive SNETMON process).

Confirmation stage—This is reported if a failure is detected when the node was sending a DC packet, or when an incoming DC packet received by the node is discarded (due to reasons such as a packet verification failure, an absent SNETMON process, or an inactive SNETMON process).

Acknowledgment stage—This is reported if a failure is detected when the node was sending a DA packet, or when an incoming DA packet received by the node is discarded (due to reasons such as a packet verification failure, an absent SNETMON process, or an inactive SNETMON process).

The Permissive Interrupt Mechanism

A permissive interrupt AVTTE is preferably implemented in hardware as follows. A well-known entry in the AVTT is marked with access permissions to all source processors in the cluster. Packets received at this entry raise an interrupt to the destination processor and are not subject to access permissions checks performed by the AVTT hardware.

An alternative implementation technique, in case the mechanism cannot be implemented in hardware, is software-assisted and entails the well-known AVTTE initially returning a negative acknowledgement (NACK) to the sender of a permissive interrupt packet. An error interrupt is raised at the destination processor when the permissive interrupt packet is NACKed. The destination processor then alters the permission of the well-known AVTTE to accept incoming packets from the sending processor unit. The sending processor unit upon receiving the NACK retries the sending of the packet causing the permissive interrupt packet to be eventually delivered at the well-known AVTTE after access permissions on that AVTTE have been assigned to the sending processor unit.

Selective Allocation of Resources

The preferred implementation of the present invention allocates ServerNet and processor resources for a node only after positive determination of an active node's presence in the cluster has been made. This allows frugal use of processor cycles, processor memory, and ServerNet resources. This feature is particularly desirable in the case of large clusters, in which scalability issues related to resource allocation and usage arise. For example, in a large 64-node cluster, a processor participating actively in the discovery mechanism (because it is running an active SNETMON process) may potentially need to install 63*16=1008 logical ServerNet devices to communicate with 63 remote nodes with 16 processors each. Similar requirements on memory allocation exist, because a certain amount of dedicated kernel memory (typically several kilobytes) is needed to store data structures needed for communication with the set of processor units in a remote node. The invention uses resources judiciously by allocating memory and logical ServerNet devices only for those remote nodes that are positively determined to be active members of the cluster.

In an alternative, but far less desirable, implementation, the logical ServerNet devices and memory for data structures that represent connectivity are allocated to all possible remote processors in a cluster. This approach consumes a significant amount of resources, especially in large scale clusters and requires the reclaiming of resources for nodes that are not present in the cluster. This alternative also entails unnecessary processing overhead and causes temporary depletion of ServerNet and memory resources.

To allocate resources selectively, the SNETMON process does not pre-allocate ServerNet and memory resources in the processor unit it is running on. The SNETMON process installs a logical ServerNet device called a Discovery Broadcast Device (DBD). The DBD is shared for multiple destination processor units and performs the function of sending DP packets to all possible other processors in the cluster. Before sending the DP packet, the DBD is reconfigured to temporarily assign the ServerNet ID of the desired other processor unit to the DBD. This ensures that the transmission hardware generates a DP packet with the correct ServerNet ID in the destination field of the packet header.

The DBD is used to communicate with all of the possible other processors without knowing ahead of time their interrupt and barrier addresses. Thus the DBD sends ServerNet packets destined for the well-known permissive AVT address.

The DBD does not receive any packets and thus does not have associated incoming interrupt and barrier AVTTEs through which packets sent from remote processors may be received.

Blocking Avoidance

The broadcast mechanism of DP packets has a particularly critical design because of two directly opposing goals. The discovery mechanism should find nodes rapidly and reliably (preferably in just a few seconds), which can only be achieved by quickly broadcasting DP packets to all possible remote processors. On the other hand, the cluster is not always maximally configured with all possible processors. DP packets sent to an absent processor will time out, and the transmission engine of the sending processor unit may be blocked for the duration of the time out interval waiting for an ACK or NACK response. In the meantime, other intervening messages can not be sent by the processor unit. This blocking occurs if the hardware serializes the transmission of messages. Blocking can be avoided if the transmission hardware is built such that it can concurrently send multiple messages. To avoid any significant blocking on serialized transmission engines, the number of DP packets that can be simultaneously queued to the hardware must be controlled.

A packet transfer that is responded to with an ACK or NACK typically completes in just a few microseconds over a high-speed interconnect such as ServerNet. A packet transfer that is not replied to, however, typically completes with a time out error after 20 milliseconds. In the case of serializing transmission hardware, a sequence of N packets could cause a total blocking time of N*20 milliseconds, if all packets encounter a time out error. For N=10 packets, for example, the total time over which the transmission hardware is blocked is 200 milliseconds. This figure typically is doubled for a cluster having two interconnect fabrics for fault tolerance, because DP packets are broadcast on both fabrics.

To avoid blocking other intervening messages during the discovery protocol (including possibly messages sent by the processor unit to other processor units in the same node), the present invention preferably limits the number of DP packets that are simultaneously queued to the hardware to a very small number (typically 1).

To achieve the goal of fast discovery of remote nodes, and still allow other intervening messages to be sent during discovery, the invention preferably implements an interrupt chaining mechanism as follows. Whenever the SNETMON process queues a DP packet to the hardware, it requests a transfer completion interrupt, and suspends itself. If the transfer completes with an ACK or NACK (which takes just a few microseconds), the SNETMON process is promptly resumed, and proceeds to queue an additional DP packet to the hardware. On the other hand, if the transfer completes with a time out error, the SNETMON process will not have run for the duration of the timeout interval (typically 20 milliseconds). During this interval, other processes are given the opportunity to queue transfer requests to the hardware. The transfer requests initiated by these other processes are typically directed to local or remote processor units to which ServerNet connections are already established, and rapidly complete with ACK responses (unless a failure has just occurred on one of the connections). When the original DP packet transfer completes with a timeout error, the SNETMON process is resumed, and is allowed to queue an additional DP packet to the hardware. Note that from the viewpoint of the order in which the transfers are queued to the hardware, regular messages are interleaved with DP packets. Consequently, the transmission hardware does not experience any significant blocking due to queuing of multiple DP packets.

Rounds

The discovery mechanism has foreground and background modes. Both of these modes are turned on only if the SNETMON process is configured for active participation in the cluster. Otherwise, the SNETMON process neither sends nor replies to discovery packets.

In the foreground mode, discovery probe (DP) ServerNet packets containing the SNETMON node number and processor number are broadcast to all the possible processors in the cluster. The foreground mode allows fast and fault-tolerant discovery of other nodes, and is used when the SNETMON process is started, when the SNETMON process migrates to a different processor unit, when the node recovers from a power outage, when the node number assigned to the node changes, and after the node is cold loaded.

The foreground mode is organized in rounds. The interval between rounds is typically 1 second or less. In a given round, a specific processor location (or number) is selected and discovery packets are broadcast to that processor number on all remote nodes. For example, in the first round discovery packets are broadcast to processor number 0 on all remote nodes, over all available fabrics. In the second round, processor number 1 is selected, and so on. The foreground mode proceeds until all processor numbers (typically 0 through 15 in one embodiment, which requires a total of 16 rounds) have been tried. After completion of discovery rounds in the foreground mode, the SNETMON process switches to the background mode.

In the background mode, discovery ServerNet packets are sent only to nodes that could not be discovered in the foreground mode. The processor list in the background mode is typically restricted to processors with higher probability of being present on a node. For example, in one server embodiment, processors 0 and 1 have higher probability of being present because such systems are usually formed by adding processors with numbers starting from 0, and scaling up to 16 processors.

The dual mode provides resilience to failures. The foreground mode uses more processor cycles and more frequent ServerNet discovery broadcast rounds to ensure fast discovery of all existing nodes. The background mode provides long-term assurance that any ServerNet nodes that could not be discovered due to a higher than tolerable number of faults will eventually be discovered, after a minimum amount of necessary repair is performed in the cluster. Background discovery attempts are also performed less frequently (typically once every 10 seconds) than the initial foreground discovery rounds.

DP packets are broadcast in rounds. The transfer completion times for DP packets (either ACK, NACK, or timeout) are sufficiently short that the SNETMON process can rapidly broadcast DP packets to all possible remote processor units in the cluster.

In the first round, DP packets are broadcast to processor number 0 on all remote nodes, over all available fabrics. In the second round, processor number 1 is selected, and so on.

In a large dual-fabric 16-node cluster, for example, it typically takes 2*15*20=600 milliseconds to complete a round, in the worst case. This figure is calculated by assuming that all DP packets sent to a particular processor number on 15 remote nodes time out. For a larger dual-fabric 64-node cluster this figure could increase to 2,520 milliseconds.

Completion of 16 rounds of DP packet broadcasts (one round each for processor numbers 0, 1, . . . , 15) in the 16-node cluster example above would require 16*600=9, 600 milliseconds in the worst case. In the 64-node cluster example above, the worst-case time increases to 16*2,520= 40,320 milliseconds. Typically, the discovery mechanism completes much earlier. Other nodes that are actively present in the cluster will reply with DI packets, and will typically be discovered in less than 1 second. DP packets continue to be broadcast to nodes that are not found in the cluster, but do not continue to be sent to nodes that have been discovered. Consequently, the duration of each round diminishes as nodes are discovered in the cluster.

The possibility that errors may be detected during the discovery protocol raises the issue of avoiding excessive or duplicate error messages in the operator log. Two mechanisms are used in this invention to avoid excessive discovery protocol error messages.

The first consists of verifying a 64-byte timestamp that is present in all types of discovery packets (DP, DI, DC, and DA). This timestamp is updated only when the SNETMON process initiates the discovery mechanism (e.g., after the SNETMON process is started, migrates to a different processor unit, or undergoes power failure recovery). The timestamp is not updated between consecutive rounds of the discovery mechanism. If a DP packet fails verification steps performed at the destination node, a discovery protocol failure error message is logged, and the timestamp of the packet is saved at the destination node. Subsequent DP packets that also fail the verification steps but carry the same timestamp will not cause error messages to be logged.

A second technique to avoid excessive error messages is used during background discovery. During background discovery, DP packets are marked to inform the destination node that error messages should not be logged. This avoids a scenario such as excessive error messages when the background discovery mechanism periodically attempts to discover a node that is not running an SNETMON process, or that is not configured for active membership in the cluster.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of automatically interconnecting a new node into a cluster of other nodes, each node including a plurality of processor units and an internal switching fabric, one of the processor units in each node hosting a monitor process, comprising:

(a) broadcasting a discovery probe packet from the monitor process in the new node to each of the plurality of processor units of all the other nodes in the cluster, the discovery probe packet containing configuration information about the new node;

(b) receiving at least one discovery probe packet at the monitor process of a discovery initiator node, a discovery initiator node being any one of the other nodes in the cluster;

(c) settings up, at the discovery initiator node, in response to the discovery probe packet, connection information enabling the new node to directly communicate with the monitor process of the discovery initiator node;

(d) sending a discovery initiator packet to all of the plurality of processor units in the new node, the discovery initiator packet containing the connection information set up at the discovery initiator node for the new node;

(e) receiving at least one discovery initiator packet at the monitor process of the new node;

(f) setting up, at the new node, in response to the discovery initiator packet, connection information enabling the discovery initiator node to directly communicate with the monitor process of the new node;

(g) sending a discovery confirmation packet directly to the monitor process of the discovery initiator node, the discovery confirmation packet containing the connection information set up at the new node for the discovery initiator node;

(h) receiving the discovery confirmation packet at the monitor process of the discovery initiator node;

(j) sending, in response to the received discovery confirmation packet, a discovery acknowledgement packet directly to the monitor process of the new node; and (k) receiving at the monitor process of the new node the discovery acknowledgement packet.

2. A method of automatically interconnecting a new node as recited in claim 1, wherein the connection information includes interrupt and barrier addresses.

3. a method of automatically interconnecting a new node as recited in claim 1,
wherein each process unit of a node has a message receiving process; and
wherein the step of receiving at least one discovery probe packet at the monitor process of a discovery initiator node includes:
(l) receiving at the message receiving process of the discovery initiator node the discovery probe packets; and
(m) forwarding the discovery probe packets from the message receiving process to the monitor process of the discovery initiatory node.

4. A method of automatically interconnecting a new node as recited in claim 3, wherein the step of forwarding is performed by means of an interprocess communications message.

5. A method of automatically interconnecting a new node as recited in claim 3, wherein the step of receiving the discovery probe packets includes responding to a permissive interrupt in the processor unit of the message receiving process.

6. A method of automatically interconnecting a new node as recited in claim 5, wherein responding to a permissive interrupt in the processor unit of the message receiving process includes:
(n) marking a well-known entry in an access validation and translation table with access permissions for all processor units in the cluster,
(p) receiving packets at the well-known entry without performing access permission checks; and (q) raising a permissive interrupt in response to the received packet.

7. A method of automatically interconnecting a new node as recited in claim 1,
wherein each processor unit of a node has a message receiving process; and
wherein the step of receiving at least one discovery initiatory packet at the monitor process of the new node includes:
(l) receiving at the message receiving processes of die new node the discovery initiator packets; and
(m) forwarding the discovery initiator packets from the message receiving process to the monitor process of the new node.

8. A method of automatically interconnecting a new node as recited in claim 7, wherein the step of forwarding is performed by means of an interprocess communications message.

9. A method of automatically interconnecting a new node as recited in claim 7, wherein the step of receiving the discovery initiator packets includes responding to a permissive interrupt in the processor unit of the message receiving process.

10. A method of automatically interconnecting a new node as recited in claim 1, further comprising the step of installing logical network devices in the discovery initiator node for all of the processor units in the new node after receiving the discovery probe packet, if the discovery probe packet is valid.

11. A method of automatically interconnecting a new node as recited in claim 1, further comprising the step of installing a logical network device in the new node for the processing unit hosting the monitoring process after receiving the discovery initiator packet, if the discovery initiator packet is valid.

12. A method of automatically interconnecting a new node as recited in claim 1, further comprising:
(l) verifying the received discovery probe packet; and
(m) if the discovery probe packet has an error, logging that an error occurred at the broadcast stage.

13. A method of automatically interconnecting a new node as recited in claim 1, further comprising:
(l) verifying the received discovery initiator packet; and
(m) if the discovery initiator packet has an error, logging that an error occurred at the initiation stage.

14. A method of automatically interconnecting a new node as recited in claim 1, further comprising:
(l) verifying the received discovery confirmation packet; and
(m) if the discovery confirmation packet has an error, logging that an error occurred at the confirmation stage.

15. A method of automatically interconnecting a new node as recited in claim 1, further comprising:
(l) verifying the received discovery acknowledgement packet; and
(m) if the discovery acknowledgement packet has an error, logging that an error occurred at the acknowledgement stage.

16. A method of automatically interconnecting a new node into a cluster of other nodes, each node including a plurality of processor units and an internal switching fabric, one of the processor units in each node hosting a monitor process, comprising:
(a) broadcasting a discovery probe packet from the monitor process in the new node to each of the plurality of processor units of all the other nodes in the cluster, the discovery probe packet containing configuration information about the new node;
(b) receiving at least one discovery probe packet at the monitor process of a discovery initiator node, the discovery initiator node being one of the other nodes of the cluster;
(c) verifying the received discovery probe packet;
(i) if the discovery probe packet is valid,
(d) setting up, at the discovery initiator node, connection information enabling the new node to directly communicate with the monitor process of the discovery initiator node; and
(e) sending a discovery initiator packet to all of the plurality of processor units in the new node, the discovery initiatory packet containing the connection information set up at the discovery initiatory node for the new node;
(f) receiving at least one discovery initiator packet at the monitor process of the new node;
(g) verifying the received discovery initiator packet;
(ii) if the discovery initiator packet is valid,
(h) setting up, at the new node, connection information enabling the discovery initiator node to directly communicate with the monitor process of the new node;
(j) sending a discovery confirmation packet directly to the monitory process of the discovery initiator node, the discovery confirmation packet containing the connection information set up at the new node for the discovery initiator node;
(l) verifying the discovery confirmation packet at the monitor process of the discovery initiator node; and
(iii) if the discovery confirmation packet is valid,
(l) sending a discovery acknowledgement packet directly to the monitor process of the new node.

17. A method of automatically interconnecting a new node into a cluster of other nodes, each node including a plurality of processor units and an internal switching fabric, one of the processor units in each node hosting a monitor process, comprising:
(a) broadcasting a discovery probe packet from the monitor process in the new node to each of the plurality of processor units of all the other nodes in the cluster, the discovery probe racket containing configuration information about the new node;
(b) receiving at least one discovery initiator packet at the monitor process of the new node, the discovery initiator packet containing connection information enabling the new node to directly communicate with the monitor process of at least one other node as the discovery initiator node;
(c) setting up, at the new node, in response to the discovery initiator packet, connection information enabling the discovery initiator node to directly communicate with the monitor process of the new node;
(d) sending a discovery confirmation packet directly to the monitor process of the discovery initiator node, the discovery confirmation packet containing the connection information set up at the new node for the discovery initiator node; and
(e) receiving a discovery acknowledgement packet in response to the discovery confirmation packet,
wherein processor units in the cluster have processor unit ids;
further comprising, prior to broadcasting a discovery probe packet, (f) installing a discovery broadcast device (DBD) which is used for broadcasting packets to all other processor units of nodes in a cluster; and
(g) reconfiguring the discovery broadcast device to temporarily assign a destination processor unit id to the discovery broadcast device; and
wherein the step of broadcasting a discovery probe packet includes broadcasting a discovery probe packet by the discovery broadcast device.

18. A method of automatically interconnecting a new node into a cluster of other nodes, each node including a plurality of processor units and an internal switching fabric, one of the processor units in each node hosting a monitor process, comprising:
(a) broadcasting a discovery probe packet from the monitor process in the new node to each of the plurality of processor units of all the other nodes in the cluster, the discovery probe packet containing configuration information about the new node;
(b) receiving at least one discovery initiator packet at the monitor process of the new node, the discovery initiator packet containing connection information enabling the new node to directly communicate with the monitor process of at least one other node as the discovery initiator node;
(c) setting up, at the new node, in response to the discovery initiator packet, connection information enabling the discovery initiator node to directly communicate with the monitor process of the new node;
(d) sending a discovery confirmation packet directly to the monitor process of the discovery initiator node, the discovery confirmation packet containing the connection information set up at the new node for the discovery initiator node; and
(e) receiving a discovery acknowledgement packet in response to the discovery confirmation packet,
further comprising, prior to broadcasting a discovery probe packet,
queuing a discovery probe packet;
requesting a transfer completion interrupt;
suspending program execution of the monitor process;
further comprising, after broadcasting the discovery probe packet,
receiving a transfer completion interrupt; and
resuming execution of the monitor process.

19. A method of automatically interconnecting a new node into a cluster of other nodes, each node including a plurality of processor units and an internal switching fabric, one of the processor units in each node hosting a monitor process, comprising:
(a) broadcasting a discovery probe packet from the monitor process in the new node to each of the plurality of processor units of all the other nodes in the cluster, the discovery probe packet containing configuration information about the new node;
(b) receiving at least one discovery initiator packet at the monitor process of the new node, the discovery initiator packet containing connection information enabling the new node to directly communicate with the monitor process of at least one other node as the discovery initiator node;
(c) setting up, at the new node, in response to the discovery initiator packet, connection information enabling the discovery initiator node to directly communicate with the monitor process of the new node;
(d) sending a discovery confirmation packet directly to the monitor process of the discovery initiator node, the discovery confirmation packet containing the connection information set up at the new node for the discovery initiator node; and (e) receiving a discovery acknowledgement packet in response to the discovery confirmation packet, further comprising, prior to broadcasting a discovery probe packet, queuing a discovery probe packet;

requesting a transfer completion interrupt;

suspending program execution of the monitor process;

further comprising, after broadcasting the discovery probe packet, receiving a timeout error interrupt; and resuming execution of the monitor process.

20. A method of automatically interconnecting a new node into a cluster of other nodes as recited in claim 19, wherein a time period between broadcasting the discovery probe packet and the timeout error interrupt permits other packets to be interleaved with broadcast discovery probe packets.

21. A method of automatically interconnecting a new node into a cluster of other nodes, each node including a plurality of processor units, each having a processor number, and an internal switching fabric, one of the processor units in each node hosting a monitor process, comprising:

(a) broadcasting a discovery probe packet from the monitor process in the new node to processor units of nodes in the cluster, wherein the processor numbers of the processor units are equal and the discovery probe packet contain configuration information about the new node;

(b) receiving at least one discovery initiator packet and the monitor process of the new node, the discovery initiator packet containing connection information enabling the new node to directly communicate with the monitor process of at least one other node as the discovery initiator node;

(c) setting up, at the new node, in response to the discovery initiator packet, connection information enabling the discovery initiator node to directly communicate with the monitor process of the new node;

(d) sending a discovery confirmation packet directly to the monitor process of the discovery initiator node, the discovery confirmation packet containing the connection information set up at the new node for the discovery initiator node; and (e) receiving a discovery acknowledgement packet in response to the discovery confirmation packet, wherein there is a minimum processor number and a maximum processor number and a current processor number is set at the minimum processor number;

wherein the broadcasting step includes broadcasting with a processor number equal to the current processor number; and further comprising;

(f) incrementing the current processor number after broadcasting the discovery probe packets to the processor units with the current processor number in all other nodes that have not yet replied with a discovery initiation packet; and (g) if the current processor number is not more than a maximum processor number, continuing at the broadcasting step with the current processor number.

22. A method of automatically interconnecting a new node into a cluster of other nodes, each node including a plurality of processor units as recited in claim 21, wherein a time period of about one second or less occurs between the broadcasting steps with consecutive processor numbers.

23. A method of automatically interconnecting a new node into a cluster of other nodes, each node including a plurality of processor units as recited in claim 21, wherein a subset of processor numbers for other nodes is known to be valid; and wherein, if the current processor number is more than a maximum processor number, continuing at the broadcasting step using only a subset of valid processor numbers for other nodes from which no discovery initiator packet was received.

24. A method of automatically interconnecting a new node into a cluster of other nodes, each node including a plurality of processor units as recited in claim 23, wherein a time period of about 10 seconds occurs between broadcasting steps using only the subset of valid processor numbers for other nodes from which no discovery initiator packet was received.

25. A method of automatically interconnecting a new node into a cluster of other nodes, each node including a plurality of processor units as recited in claim 23, wherein only processor numbers that are likely to be present in other nodes from which no discovery initiator packet was received are used in the broadcasting step.

26. A method of automatically interconnecting a first new node and a second new node into a cluster of other nodes, the first new node having a lower node number than the second new node, each node including a plurality of processor units and an internal switching fabric, one of the processor units in each node hosting a monitor process, comprising:

(a) broadcasting a discovery probe packet from the monitor process in the first new node to each of the plurality of processor units of the second new node and all the other nodes in the cluster, the discovery probe packet containing configuration information about the first new node, (b) broadcasting, concurrently with step (a), a discovery probe packet from the monitor process in the second new node to each of the plurality of processor units of the first new node and all the other nodes in the cluster, the discovery probe packet containing configuration information about the second new node;

(c) receiving at least one discovery initiator packet at the monitor process of the first new node from each one of the other nodes acting as a first set of discovery initiator nodes, with each discovery initiator packet containing connection information enabling the first new node to directly communicate with the monitor processes of the first set of discovery initiator nodes;

(d) receiving at least one discovery initiator packet at the monitor process of the second new node from each one of the first new node and the other nodes acting as a second set of discovery initiator nodes, with each discovery initiator packet containing connection information enabling the second new node to directly communicate with the monitor processes of the second set of discovery initiator nodes;

(e) setting up, at each of the new nodes, in response to the discovery initiator packets, connection information enabling the discovery initiator nodes to directly communicate with the monitor process of each of the new nodes;

(f) sending a discovery confirmation packet by the first new node directly to the monitor processes of each one of the first set of discovery initiator nodes, with each discovery confirmation packet containing the connection information, set up at the first new node, and specific to each node of the first set of discovery initiator nodes to which the packet is sent;

(g) sending a discovery confirmation packet by the second new node directly to the monitor processes of each one of the second set of discovery initiator nodes, with each discovery confirmation packet containing the connection information, set up at the second new node, and specific to each node of the second set of discovery initiator nodes to which the packet is sent; and (h) receiving, at each of the new nodes, a discovery acknowledgement packet in response to the discovery confirmation packet.

27. A method of automatically interconnecting a first new node and a second new node into a cluster of other nodes, each node having a node number and including a plurality of processor units and an internal switching fabric, one of the processor units in each node hosting a monitor process, comprising:

(a) receiving at least two discovery probe packets at the monitor processes of first new node, second new node and the other nodes in the cluster, one of the two discovery probe packets containing configuration information about the first new node, the other of the two discovery probe packets containing configuration information about the second new node, the first new node having a lower node number than the second new node;

(b) setting up, at each of the other nodes, in response to the discovery probe packets sent by the first new node, connection information enabling the first new node to directly communicate with the monitor process of each of the new nodes;

(c) settings up, at the first new node and each of the other nodes, in response to the discovery probe packets sent by the second node, connection information enabling the second new node to directly communicate with the monitor processes of the first new node and the other nodes;

(d) sending discovery initiator packets from the other nodes to all of the plurality of processor units in the first new node, the discovery initiator packets containing the connection information set up at the other nodes for the first new node;

(e) sending discovery initiator packets from the first new node and the other nodes to all of the plurality of processor units in the second new node, the discovery initiator packets containing the connection information set up at first new node and the other nodes for the second new node; and (f) receiving a discovery confirmation packet at the monitor process of each one of the other nodes, the discovery confirmation packet containing the connection information enabling each one of the other nodes to directly communicate with the monitor process of the first new node;

(g) receiving a discovery confirmation packet at the monitor processes of each one of the first new nodes and the other nodes, the discovery confirmation packet containing connection information enabling each one of the first new node and the other nodes to directly communicate with the monitor process of the second new node;

(h) sending, in response to each discovery confirmation packet received in step (f), a discovery acknowledgement packet from the other nodes directly to the monitor process of the first new node; and (j) sending, in response to each discovery confirmation packet received in step (g), a discovery acknowledgement packet from the first new node and the other nodes directly to the monitor process of the second new node.

* * * * *

UNITED STATES PATENT AND TRADEMARK OFFICE
CERTIFICATE OF CORRECTION

| | | |
|---|---|---|
| PATENT NO. | : 6,977,908 B2 | Page 1 of 2 |
| APPLICATION NO. | : 09/945083 | |
| DATED | : December 20, 2005 | |
| INVENTOR(S) | : Marcelo de Azevedo et al. | |

Figure 1:
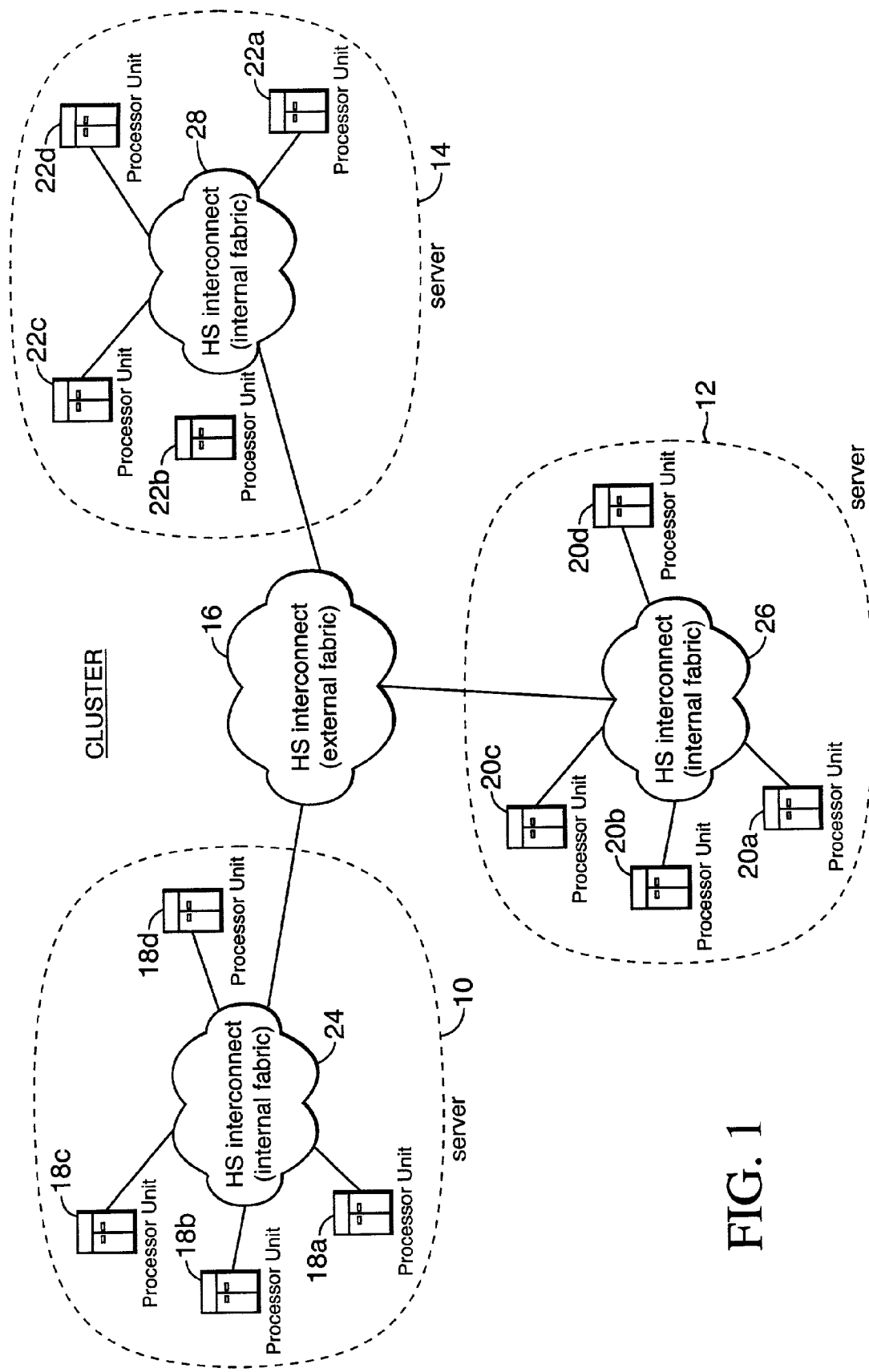
FIG. 1 shows a system setting in which the methods of the present invention are carried out and the apparatus of the present invention reside.
Figure 2A:
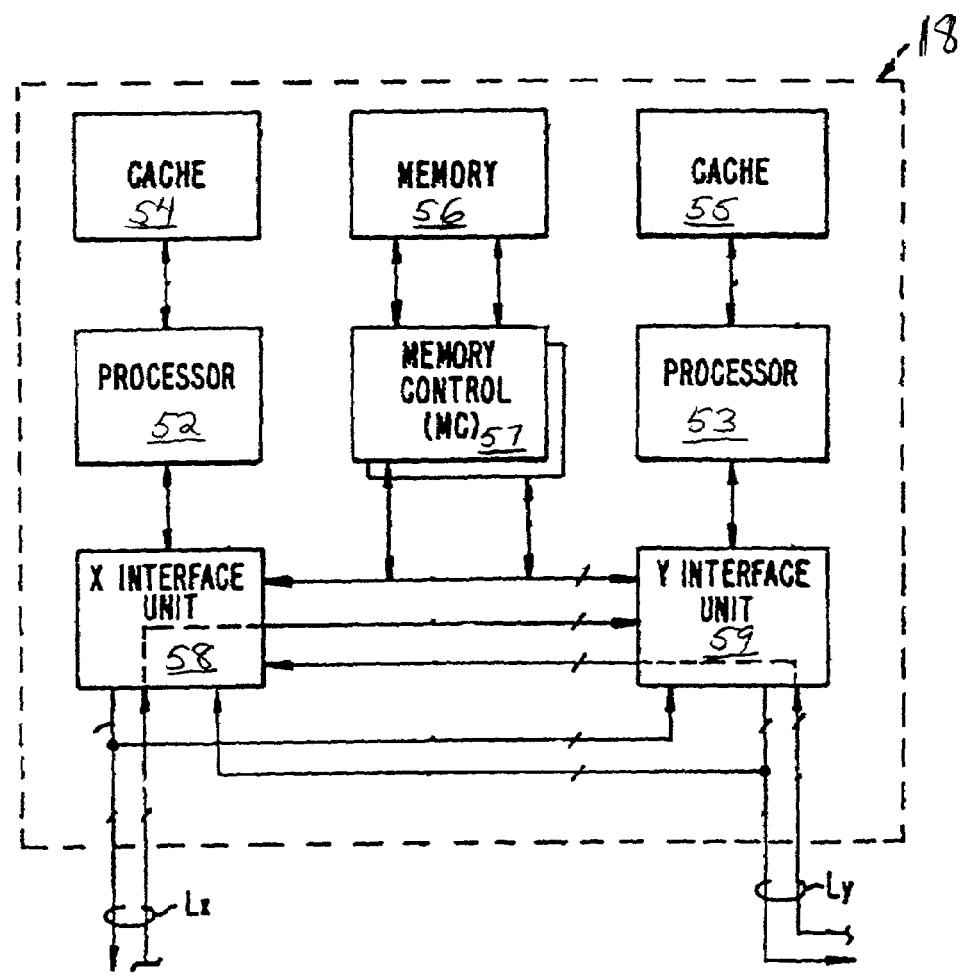
FIG. 2A shows a representative processor unit used in the servers of FIG. 1.
Figure 2B:
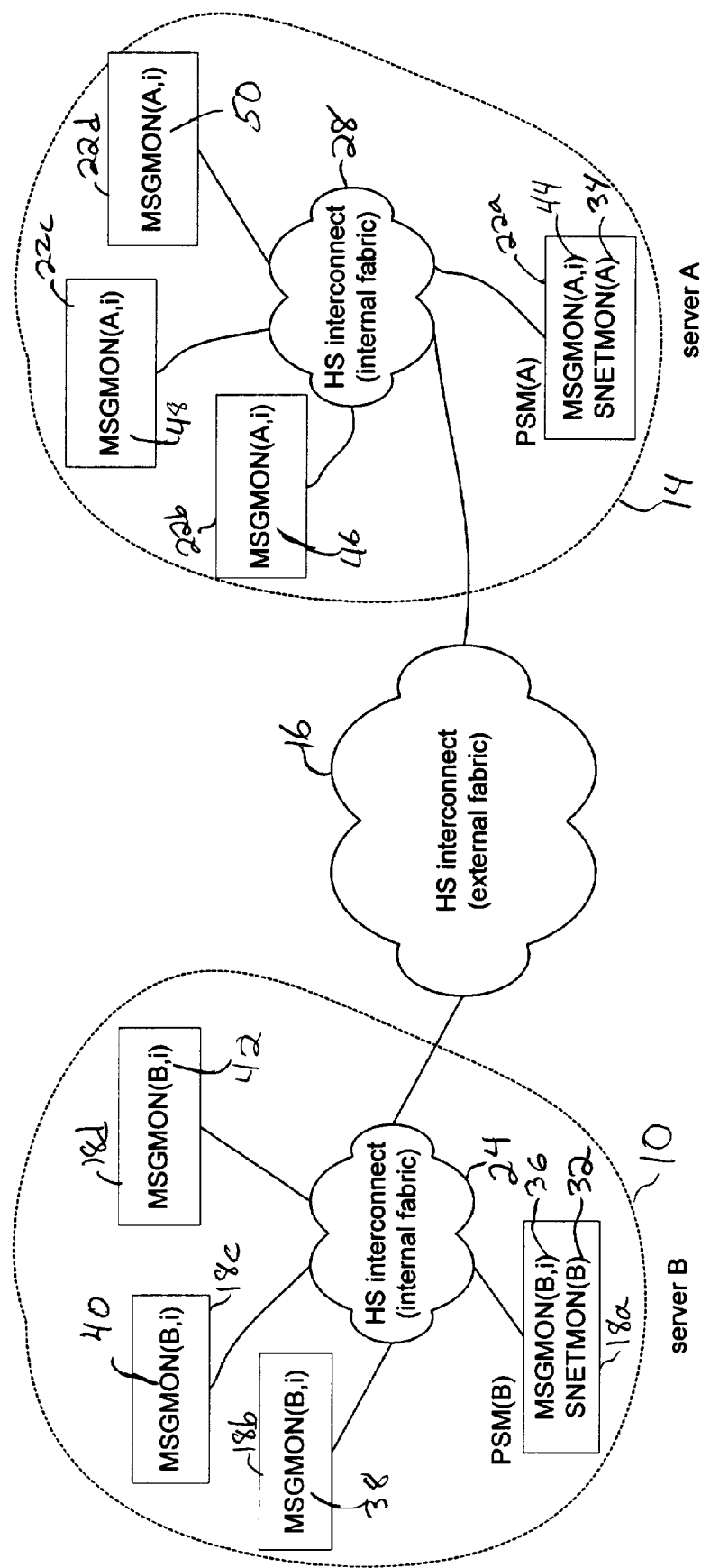
FIG. 2B shows two servers connected together by an external fabric.

It is certified that error appears in the above-identified patent and that said Letters Patent is hereby corrected as shown below:

On sheet 2 of 11, in Fig. 2A, under "Lx" insert -- TO INTERNAL FABRIC --.

On sheet 2 of 11, in Fig. 2A, under "Ly" insert -- TO INTERNAL FABRIC --.

In column 19, line 7, in Claim 1, delete "settings" and insert -- setting --, therefor.

In column 19, line 44, in Claim 3, delete "process" and insert -- processes --, therefor.

In column 19, line 48, in Claim 3, after "receiving" delete "process" and insert -- processes --, therefor.

In column 20, line 10, in Claim 7, delete "die" and insert -- the --, therefor.

In column 21, line 35, in Claim 16, delete "(1)" and insert -- (m) --, therefor.

In column 21, line 45, in Claim 17, delete "racket" and insert -- packet --, therefor.

In column 24, line 11, in Claim 23, delete "a" and insert -- the --, therefor.

In column 24, line 13, in Claim 23, delete "a" and insert -- the --, therefor.

In column 24, line 41, in Claim 26, delete "node," and insert -- node; --, therefor.

In column 25, lines 35-36, in Claim 27, delete "process of each of the new nodes;" and insert -- processes of the other nodes; --, therefor.

UNITED STATES PATENT AND TRADEMARK OFFICE
CERTIFICATE OF CORRECTION

PATENT NO. : 6,977,908 B2
APPLICATION NO. : 09/945083
DATED : December 20, 2005
INVENTOR(S) : Marcelo de Azevedo et al.

It is certified that error appears in the above-identified patent and that said Letters Patent is hereby corrected as shown below:

In column 25, line 37, in Claim 27, delete "settings" and insert -- setting --, therefor.

Signed and Sealed this

Twenty-eighth Day of July, 2009

JOHN DOLL
*Acting Director of the United States Patent and Trademark Office*